(12) United States Patent
Horie

(10) Patent No.: US 6,314,073 B2
(45) Date of Patent: Nov. 6, 2001

(54) DISC DRIVE APPARATUS WITH INSERTION ERROR INHIBIT MEANS FOR RECORDING MEDIA HAVING DIFFERENT STRUCTURES

(75) Inventor: Fumio Horie, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,839

(22) Filed: Dec. 21, 1998

(30) Foreign Application Priority Data

Dec. 22, 1997 (JP) .................................................... 9-352825

(51) Int. Cl.[7] .................................................. G11B 33/02
(52) U.S. Cl. ........................................ 369/77.2; 369/75.2
(58) Field of Search ............................... 369/77.2, 77.1, 369/75.1, 75.2, 191

(56) References Cited

U.S. PATENT DOCUMENTS

| | | | |
|---|---|---|---|
| 5,301,176 | * 4/1994 | Kawachi et al. ..................... | 369/75.2 |
| 5,572,498 | * 11/1996 | Choi ..................................... | 369/77.2 |
| 5,586,104 | * 12/1996 | Choi ..................................... | 369/264 |
| 5,615,197 | * 3/1997 | Choi ..................................... | 369/77.2 |
| 5,737,293 | * 4/1998 | Kawamura et al. ................. | 369/77.1 |
| 5,768,240 | * 6/1998 | Hiraga ................................. | 369/75.2 |
| 5,867,338 | * 2/1999 | Ohira et al. ......................... | 369/75.2 |
| 6,002,660 | * 12/1999 | Ikegame .............................. | 369/77.2 |

* cited by examiner

Primary Examiner—Robert S. Tupper
Assistant Examiner—Julie Anne Watko
(74) Attorney, Agent, or Firm—Jay H. Maioli

(57) ABSTRACT

A cartridge accommodating a first disc and a bare second disc are loaded selectively along the same loading center apparatus. Thereby, a small sized, light weight and low cost optical disc drive which can selectively reproduce the disc accommodated in the cartridge and the bare second disc is obtained.

16 Claims, 37 Drawing Sheets

CROSS SECTION B-B

DISC DRIVE APPARATUS WITH INSERTION ERROR INHIBIT MEANS FOR RECORDING MEDIA HAVING DIFFERENT STRUCTURES

BACKGROUND OF THE INVENTION

1. Field of the Invention

The present invention relates to a disc drive apparatus which is optimum for introduction to an optical disc drive and also particularly to the technical field of disc drive which enabling selective recording and/or reproducing of two kinds of disc type recording media such as a mini-disc (MD) cartridge and a bare compact disc (CD).

2. Description of the Related Art

It has been attempted to use a couple of spindle motors for individually chucking an MD cartridge and a bare CD in order to selectively record and/or reproduce the MD cartridge and bare CD with a disc drive unit. In this case, a couple of spindle motors are arranged side by side and only one optical pickup has been moved to the right and left directions between a couple of spindle motors.

However, in the disc drive of this type, a couple of loading mechanisms are arranged side by side to independently load the MD cartridge and bare CD. Therefore, a large space is required and a couple of spindle motors are required, resulting in increase in total size and weight of the disc drive and also increase in the number of parts and assembling processes which are related to remarkable rise of cost. Moreover, it has been so far impossible to load and unload the MD cartridge and bare CD through only one slot.

SUMMARY OF THE INVENTION

The present invention has been proposed to overcome the problems explained above and it is therefore an object of the present invention to provide a small size, light weight and low cost disc drive which enables selective recording and/or reproducing of two kinds of disc type recording media such as MD cartridge and bare disc.

The disc drive of the present invention to attain the object explained above is provided with a means which arranges on the same loading center the loading path of a first and a second loading means to selectively load a first and a second disc type recording media in order to selectively input and output first and second disc tables to selectively chuck the first and second disc type recording media into the loading path of the first and second loading means from the direction orthogonal to these loading directions.

The disc drive of the present invention structured as explained above selectively loads the first and second disc type recording media on the same loading center to selectively chuck these media to the first and second disc table.

DESCRIPTION OF THE PREFERRED EMBODIMENTS

Figure 1:
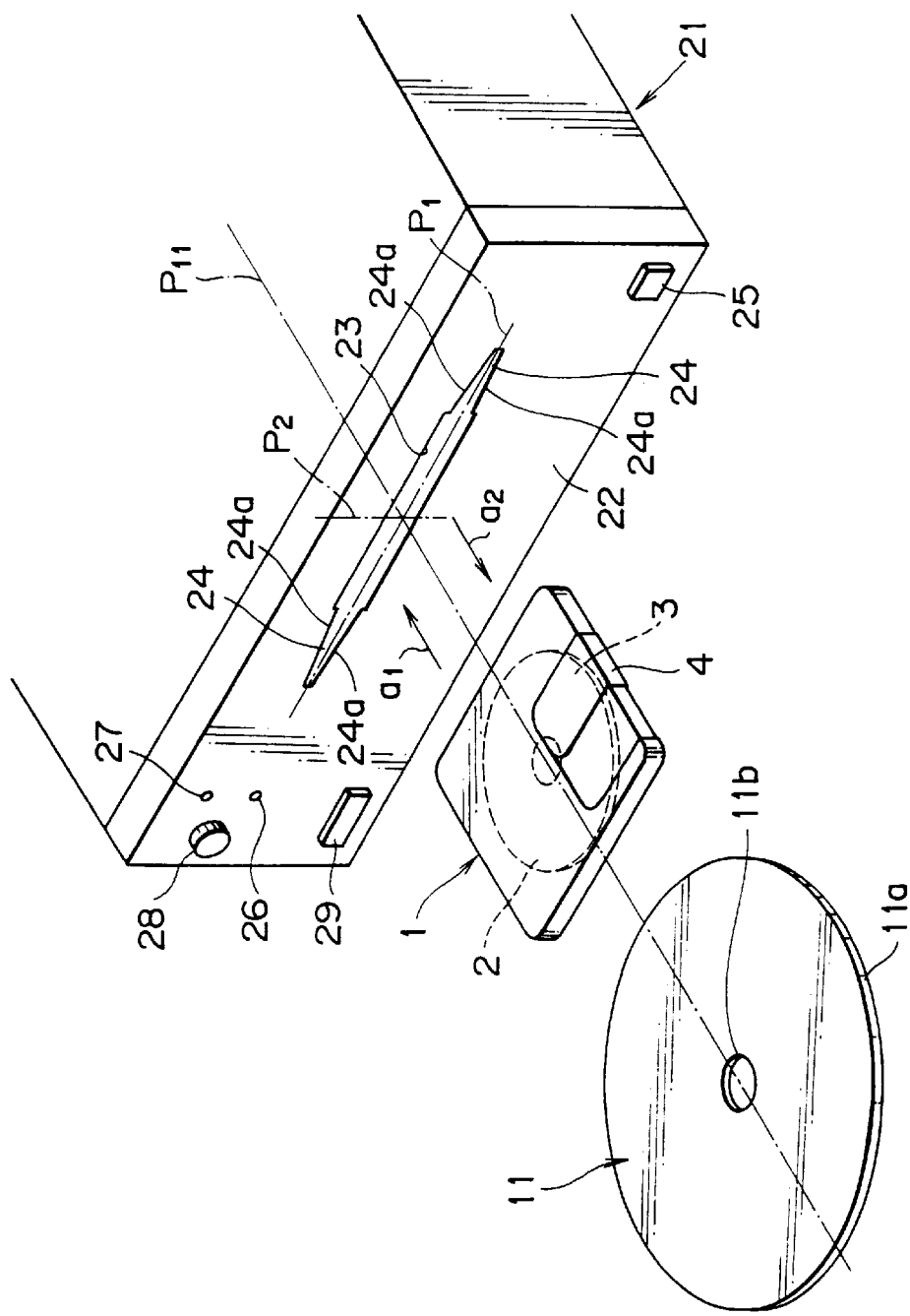
FIG. 1 is a perspective view for explaining a first and a second inserting slot of the front panel in a preferred embodiment of the optical disc drive to which the present invention is applied.

A preferred embodiment of the disc drive to which the present invention is applied will be explained below with reference to the accompanying drawings. The disc drive explained in this embodiment suggests an optical disc drive for selective recording and/or reproducing of a couple of disc type recording media such as an MD cartridge and bare CD. This optical disc drive will be explained in the following sequence.

(1) Explanation about insertion slot (slot-in port) of front panel
(2) Explanation about a loading means
(3) Explanation about a disc table
(4) Explanation about a chucking pulley
(5) Explanation about mechanical deck and spindle motor lifting apparatus (1) Explanation About Insertion Slot (Slot-in Port) of Front Panel As shown in FIG. 1 to FIG. 8, a MD (mini-disc) cartridge 1 is used as an example of a thick and narrower first disc type recording medium. In this MD cartridge 1, a mini-disc 2 in the diameter of 64 mm is accommodated under the rotatable condition. Moreover, a bare CD (Compact Disc) 11 in diameter of 120 mm is also used as an example of thinner and wider second disc type recording medium.

The front panel 22 formed of synthetic resin of the optical disc drive 21 is provided with a thicker and narrower elongated and horizontal first insertion slot 23 having the thickness T1 and width W1 to insert an MD cartridge 1 from the direction of arrow mark a1 and a thinner and wider elongated and horizontal second insertion slot 24 having the thickness T2 and width W2 to insert a bare CD (hereinafter referred only to as CD) 11 from the same direction of arrow mark a1. In this case, these first and second insertion slots 23, 24 are arranged to be overlapped in the thickness direction. In more detail, the centers P1 in the thickness direction (vertical direction) of the first and second insertion slots 23, 24 are matched with each other and these first and second insertion slots 23, 24 are arranged in the same height position. In regard to the centers P2 in the width direction (horizontal direction) of the first and second insertion slots 23, 24, the center of the MD 2 in the MD cartridge 1 is matched by the arrangement with the center of the CD 11. Therefore, the both ends in the width direction of the second insertion slot 24 having the larger width W2 are projected over both right and left sides of the first insertion slot 25 having the smaller width W1. The tapered surface 24 which is almost symmetrical in the right and left directions is formed in both sides of the upper and lower directions of both right and left end portions of the second insertion slot 24 so that when CD 11 is slotted in, the center in the thickness direction of the CD 11 can be matched with the center of the thickness direction of the MD cartridge 1.

The front panel 22 is provided with a power switch 25, a couple of display lamps 26, 27 for displaying the operating conditions of MD 2 and CD 11, a switch 28 to select these lamps 26, 27 and an eject switch 29, etc. In this optical disc drive 21, as a system which assures priority for insertion of any one of the MD cartridge 1 and CD 11, the system which assures priority of insertion of CD 11 (insertion of CD 11 can always be performed freely) and inhibits careless insertion of MD cartridge 11 is introduced.

Figure 2:
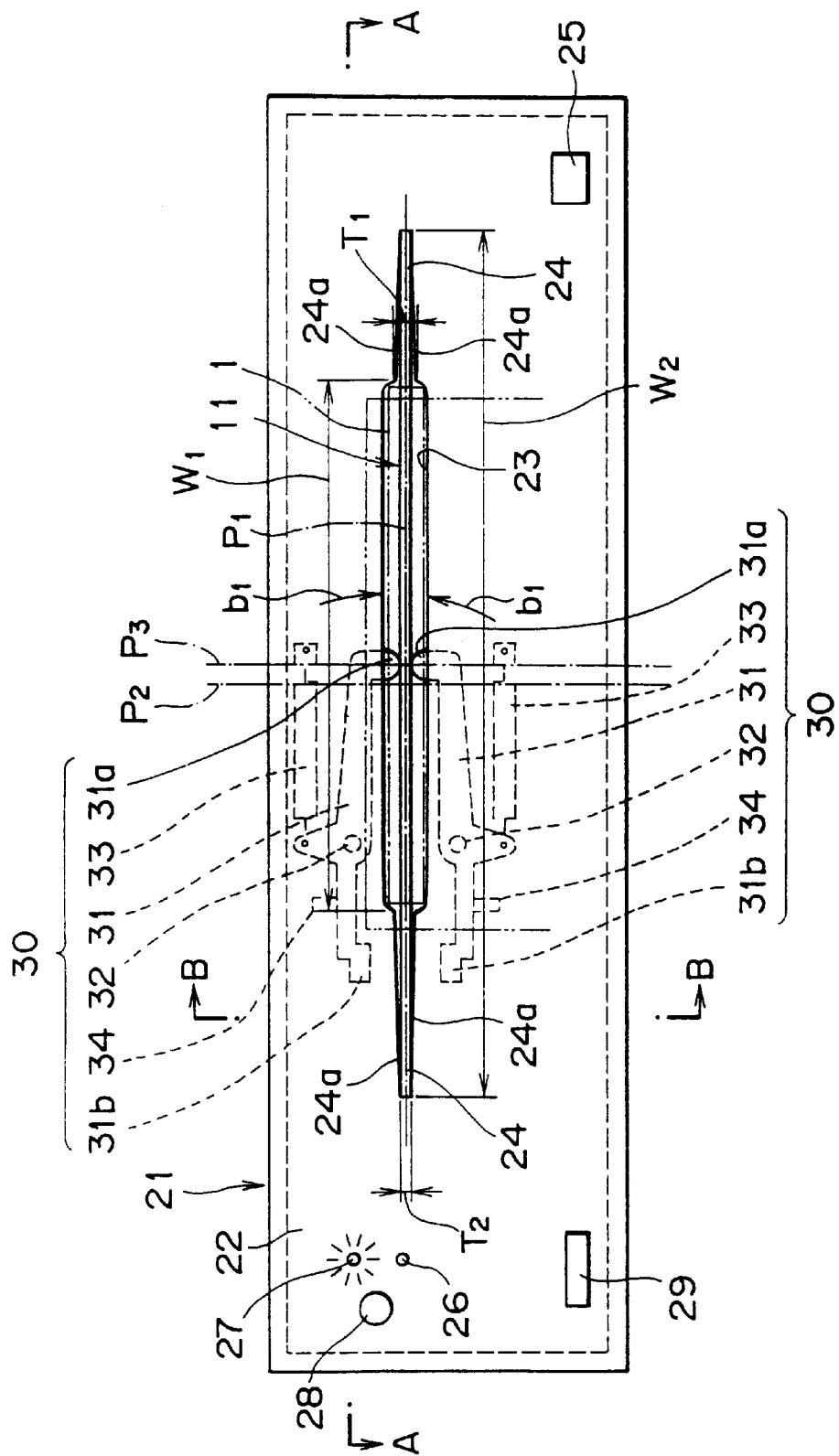
FIG. 2 is a front elevation for explaining the CD priority condition at the front panel.

Therefore, an inhibit means 30 for inhibiting careless insertion of the MD cartridge 1 is provided at the inside of the front panel 22, as shown in FIG. 2. For this insertion inhibit means 30, a couple of upper and lower insertion inhibit shutters 31 are used. These upper and lower insertion inhibit shutters 31 are formed symmetrically in the upper and lower direction of synthetic resin and a couple of these upper and lower insertion inhibit shutters 31 are provided, to freely rotate symmetrically in the upper and lower directions indicated by the arrow marks b1, b2, at the internal side of the front panel 22 via a couple of upper and lower fulcrum pins 32. A couple of these upper and lower insertion inhibit shutters 31 are urged to rotate in the direction of the arrow mark b1 with a shutter spring 33 consisting of a tensile coil springs as a couple of upper and lower rotation urging means extended to the internal side of the front panel 22 and are thereby placed in contact, for fixing purpose S, with a couple of upper and lower stoppers 34 integrated at the internal side of the front panel 22. Under the condition that a couple of these upper and lower insertion inhibit shutters 31 are placed in contact with a couple of upper and lower stoppers 34 from the direction of arrow mark b1, insertion inhibit protections 31a integrally formed at one end portions of a couple of these upper and lower insertion inhibit shutters 31 are engaged from the upper and lower directions with the internal side of the first insertion slot 23 almost at the center position P3 in the width direction of the first insertion slot 23. However, a couple of these upper and lower insertion inhibit projections 31a are structured free in the upper and lower directions for the second insertion slot 24 having a small thickness T2 and are engaged with the internal side in the upper and lower directions only for the first insertion slot 23 having a large thickness T1. The other end portions of a couple of these upper and lower insertion inhibit shutters 31 are integrally provided with a couple of insertion resetting projections 31b formed in the shape of a pin.

Figure 6:
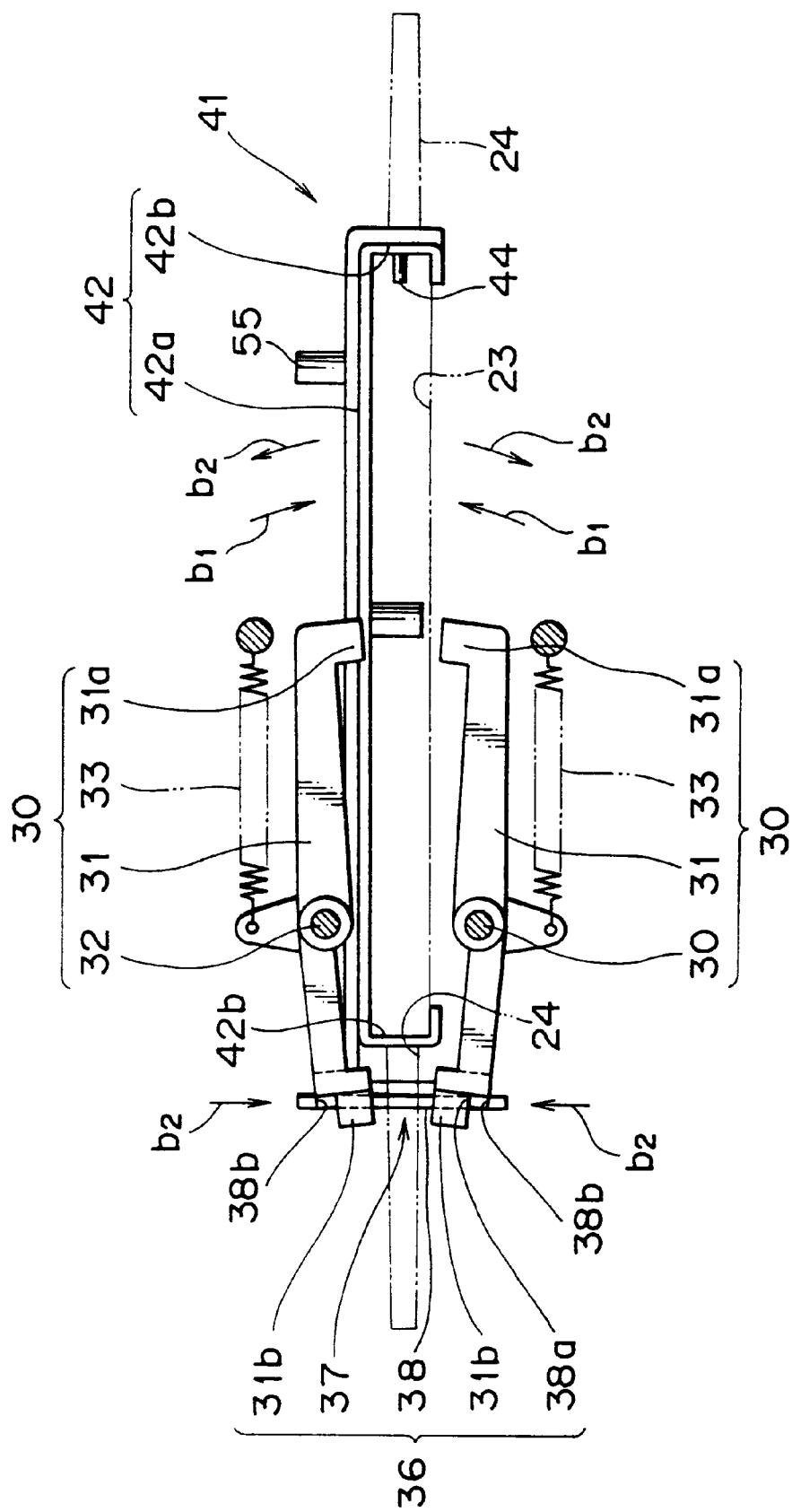
FIG. 6 is a partly cutout front elevation showing the condition that the insertion inhibit mode of the insertion inhibit means attached to the front panel explained above is canceled.

In addition, at the internal side of the front panel 22, a resetting means 36 is also provided to reset the insertion inhibit condition of the MD cartridge 1 by turning symmetrically a couple of upper and lower insertion inhibit shutters 31 in the direction of arrow mark b2 as the opening direction as shown in FIG. 6. This resetting means 36 is structured by a vertical resetting plate 37 which is provided facing forward at the front end of one side surface of a cartridge holder 42 of the MD loading apparatus 41, as will be explained later. At the front end of this resetting plate 37, an almost U-shaped cutout portion 38 is formed and the tapered surface 38b extended widely toward the forward direction (direction of arrow mark a2) is formed at the front end of the upper and lower end portions 38a of this cutout portion 38.

The first and second insertion slots 23, 24, insertion inhibit means 30 and resetting means 36 formed on the front panel 22 of this optical disc drive 21 are structured as explained above.

Therefore, according to this optical disc drive 21, two kinds of disc type recording media of the MD cartridge 1 and CD 11 can be selectively inserted by the slot-in system in the direction of the arrow mark a1 in the same height position from the first and second insertion slots 23, 24. In this case, total thickness of the optical disc drive 21 can be reduced in comparison with the apparatus where the first and second insertion slots 23, 24 are arranged, for example, in the two stages of the upper and lower stages. Moreover, width of the optical disc drive 21 can also be reduced in comparison with the apparatus where the first and second insertion slots 23, 24 are arranged side by side in the horizontal direction.

Here, this optical disc drive 21 assures priority for insertion of CD 11 as explained above and inhibits careless insertion of MD cartridge 1.

Namely, when a user turns ON the power switch 25 to activate the optical disc drive, the MD lamp 26 does not light but the CD lamp 27 lights up as shown in FIG. 2, to always set the apparatus to the CD insertion priority mode and also indicate that insertion of CD has priority to a user with the CD lamp 27. Under this CD insertion priority condition, when the CD 11 is inserted, by the slot-in system, in the direction of arrow mark a1 from the second insertion slot 24, the CD 11 can be inserted freely in such a manner that it passes the clearance between the upper and lower sides of the insertion inhibit projection 31a of a couple of the upper and lower insertion inhibit shutters 31. The CD 11 inserted is then loaded up to the chucking position common to the MD and CD by the CD loading apparatus 71 which will be explained later.

However, when it is attempted to insert the MD cartridge 1 by the slot-in system in the direction of the arrow mark a1 from the first insertion slot 23, careless insertion of the MD cartridge 1 can be inhibited because the MD cartridge 1 is placed in contact with a couple of upper and lower insertion inhibit projections 31a of a couple of upper and lower insertion inhibit shutters 31.

Figure 3:
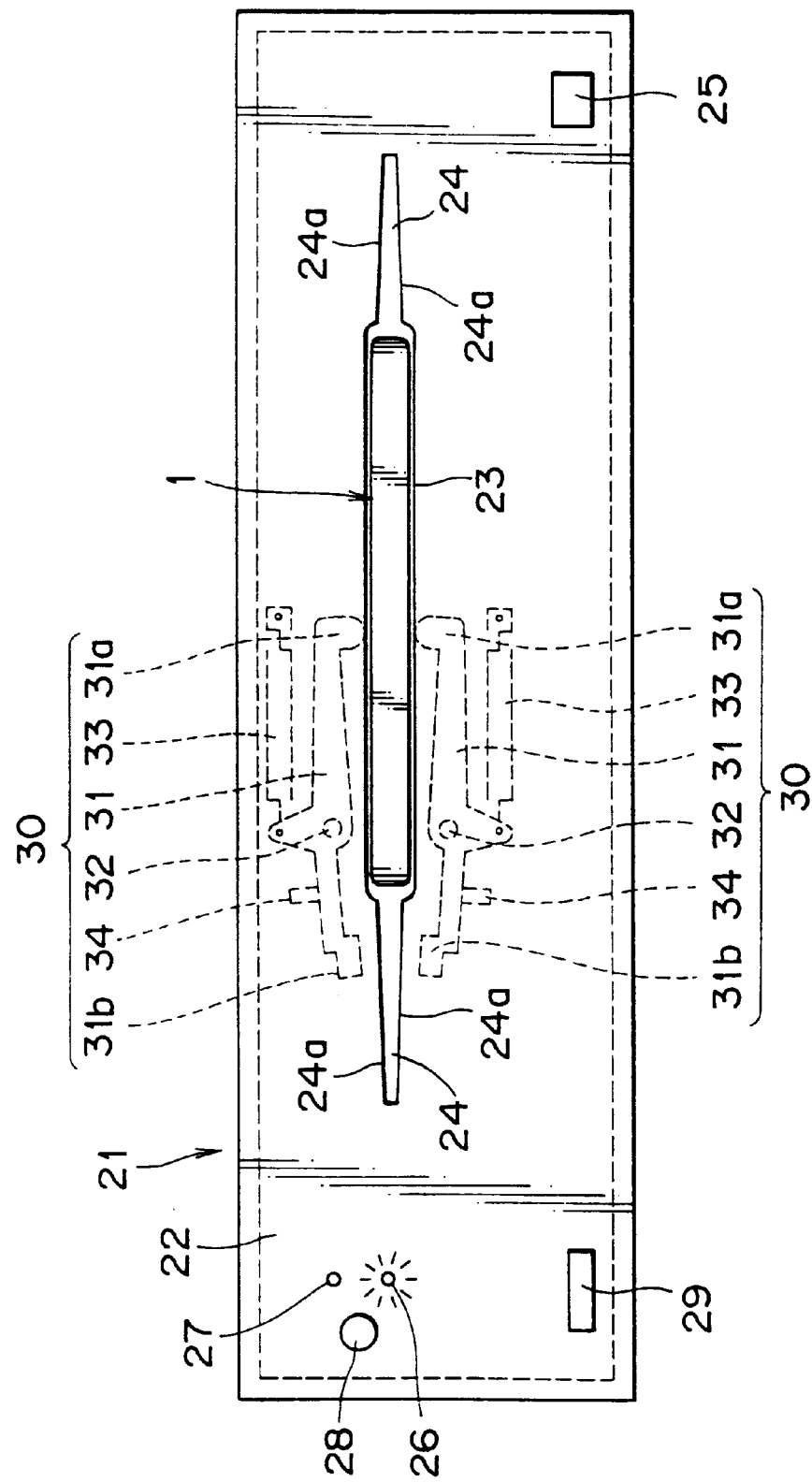
FIG. 3 is a front elevation for explaining the MD priority condition at the front panel.
Figure 4:
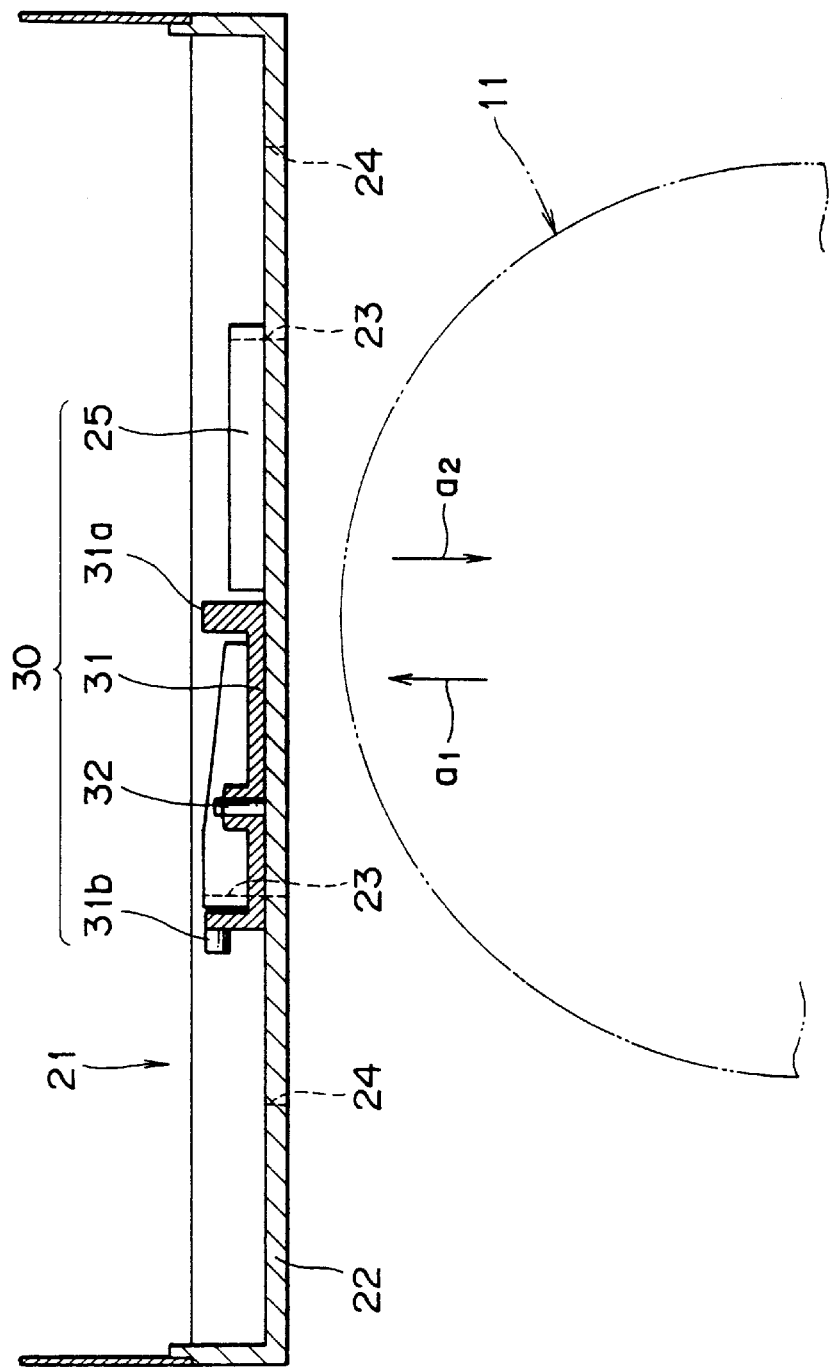
FIG. 4 is a plan view of cross-section of the plane A—A in FIG. 2.
Figure 5:
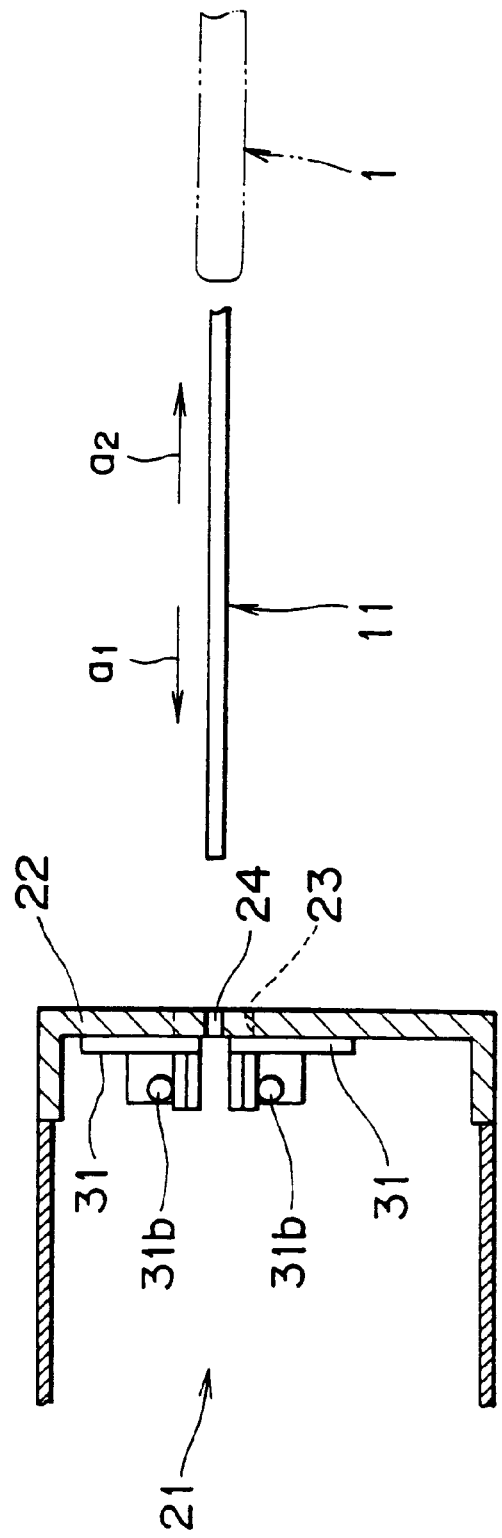
FIG. 5 is a side elevation of cross-section of the plane B—B in FIG. 2.
Figure 8:
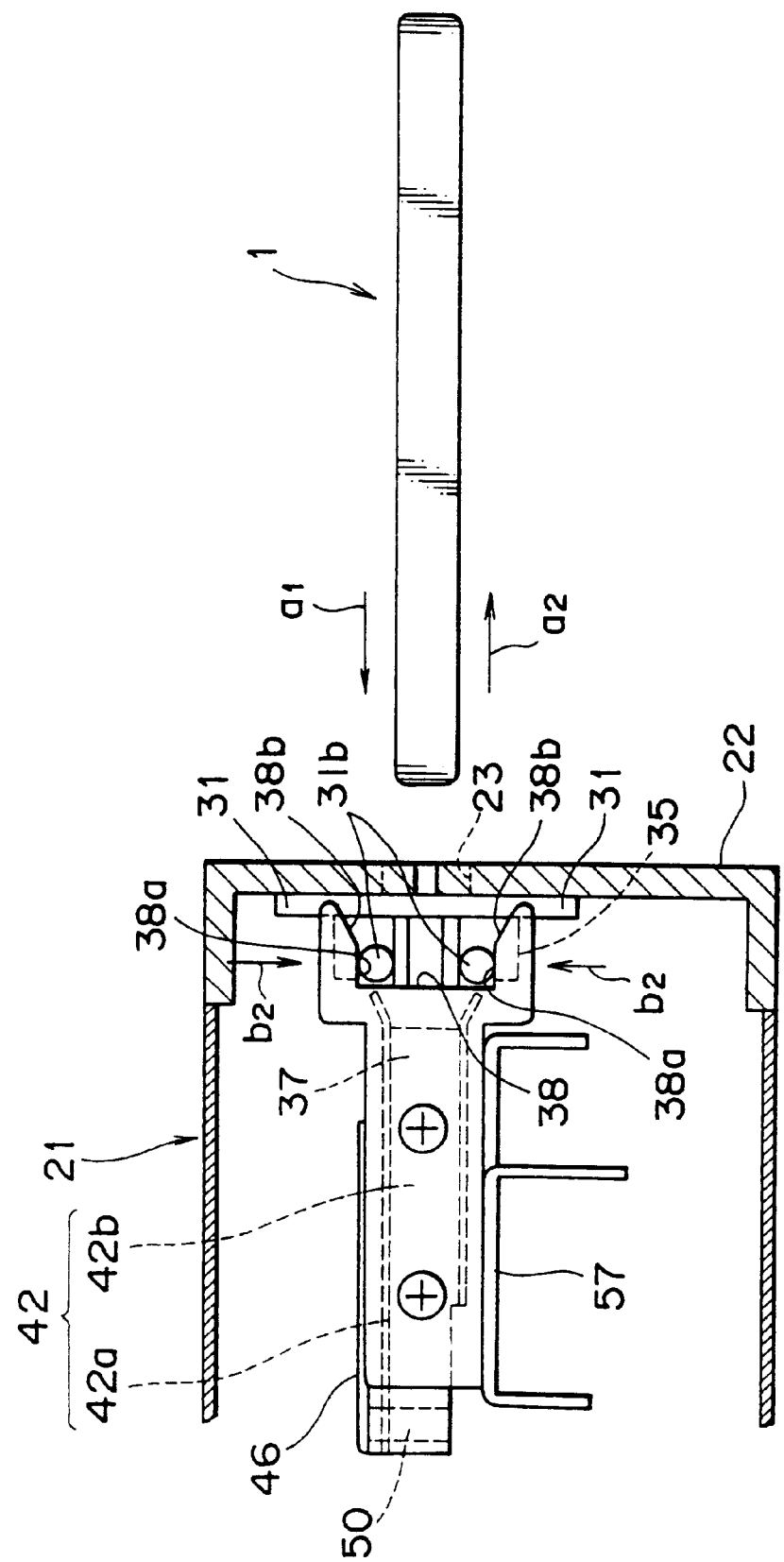
FIG. 8 is a partly cutout side elevation of FIG. 7.
Figure 9:
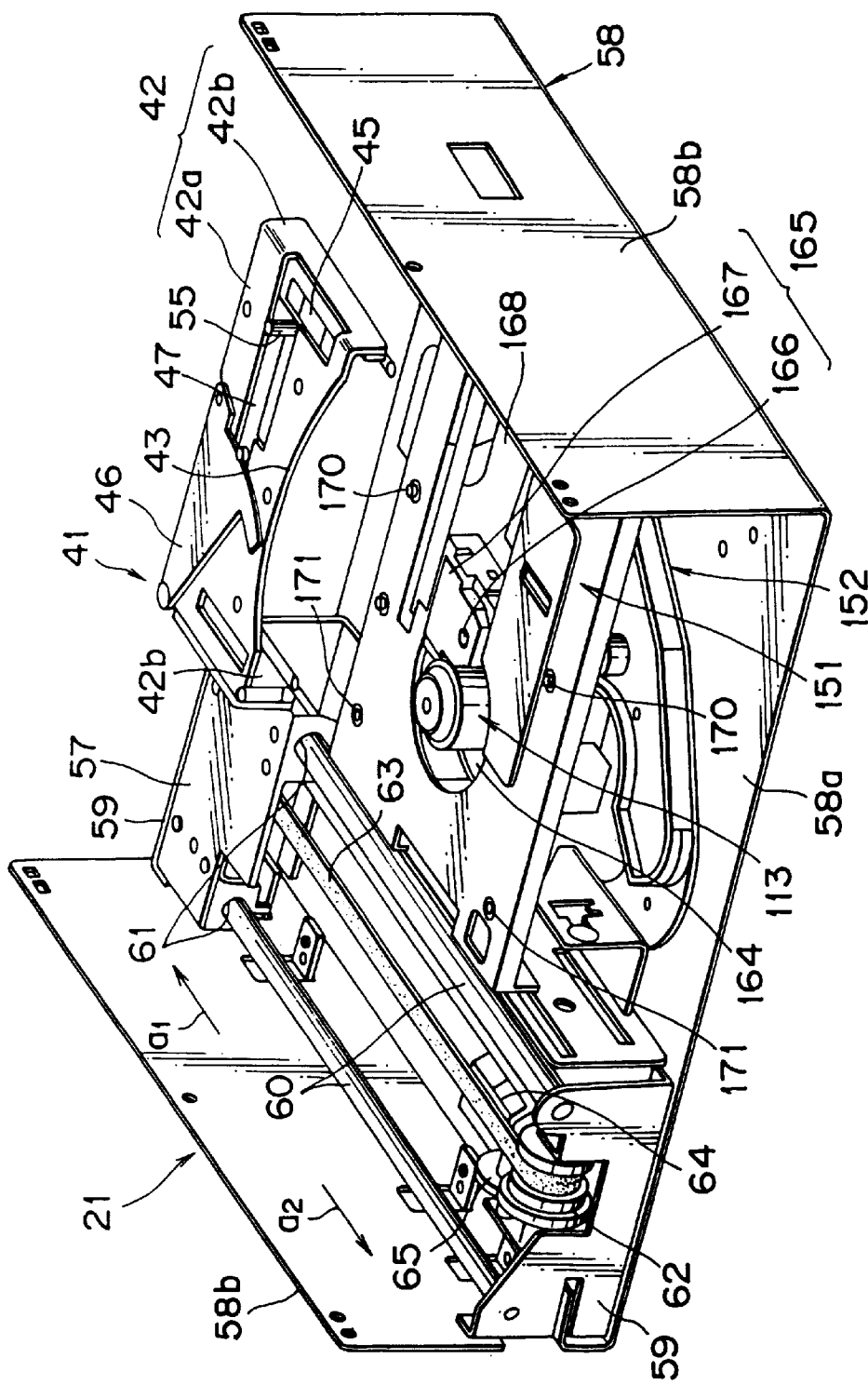
FIG. 9 is a perspective view for explaining an evacuating position of a cartridge holder caused by the MD loading apparatus provided within the optical disc drive.

Next, when a user depresses the selection switch 28, the CD lamp 27 goes out and the MD lamp 26 lights as shown in FIG. 3 to select the MD priority mode to indicate to a user with the MD lamp 26 that insertion of MD has the priority. Under the condition that the insertion of MD has priority, the cartridge holder 42 of the MD loading apparatus 41 goes forward from the direction of the arrow mark a2 and stops at the receiving position of the MD cartridge 1 near the internal side of the front panel 22, as shown in FIG. 8. The cutout portion 38 of the reset plate 37 attached to one side surface of the cartridge holder 42 is engaged, from the direction of arrow mark a2, with both upper and lower sides of the insertion reset projections 31b of a couple of upper and lower insertion inhibit shutters 31. In this case, a couple of upper and lower insertion reset projections 31b are guided by a couple of upper and lower tapered surfaces 38b and are then mutually attracted in the direction of the arrow mark b2 up to the upper and lower end portions 38. Thereby, as shown in FIG. 3 and FIG. 6, a couple of upper and lower insertion inhibit shutters 31 are rotated symmetrically in the direction of the arrow mark b2 against a couple of upper and lower shutter springs 33 and thereby a couple of upper and lower insertion inhibit projections 31a are set free in the upper and lower sides of the first insertion slot 23.

Therefore, under the MD insertion priority condition, the first insertion slot 23 is opened and therefore the MD cartridge 1 can freely be inserted, by the slot-in system, in the direction of the arrow mark a1 from the first insertion slot 23. The MD cartridge 1 inserted is further inserted in the direction of arrow mark a1 into the cartridge holder 42 and is then held therein. This MD cartridge 1 is then loaded up to the common chucking position for MD and CD by means of the cartridge holder 42 as will be explained later.

In this optical disc drive 21, there is provided an insertion error inhibit means to inhibit insertion error of the MD cartridge 1 and CD11 while the recording and/or reproducing operation is performed for any one of the MD 2 in the MD cartridge 1 and CD11. That is, since the first and second insertion slots 23, 24 are arranged in the same height position, the MD cartridge 1 works as the insertion error inhibit means while recording and/or reproducing operation is being performed to MD 2, while the CD 11 works as the insertion error inhibit means while recording and/or reproducing operation is being performed to CD 11. Thereby, insertion error of the MD cartridge 1 and CD 11 can be inhibited.

(2) Explanation About Loading Means

Next, as shown in FIG. 9 to FIG. 20, FIG. 22 to FIG. 24, FIG. 26 to FIG. 28 and FIG. 32 to FIG. 34, the optical disc drive 21 comprises, at its inside, an MD loading apparatus 41 and a CD loading apparatus 71 forming a loading means for a couple of disc type recording media.

As shown in FIG. 9 to FIG. 14, FIG. 22 to FIG. 24, the MD loading apparatus 41 is provided with a cartridge holder 42 formed of a metal plate and this cartridge holder 42 is formed in almost a U-shape with the horizontal ceiling plate 42a and both right and left side plates 42b which are bent almost in the U-shape to the lower side and internal side from both right and left side edges of the ceiling plate 42a. Therefore, the MD cartridge 1 is held through horizontal insertion, also allowing removal, in the direction of the arrow mark a2 between both right and left side plates 42b at the lower part of the ceiling plate 42a of the cartridge holder 42. The front end of the ceiling plate 42a is provided with an arc-shaped cutout portion 43 for providing clearance for the CD 11.

Figure 7:
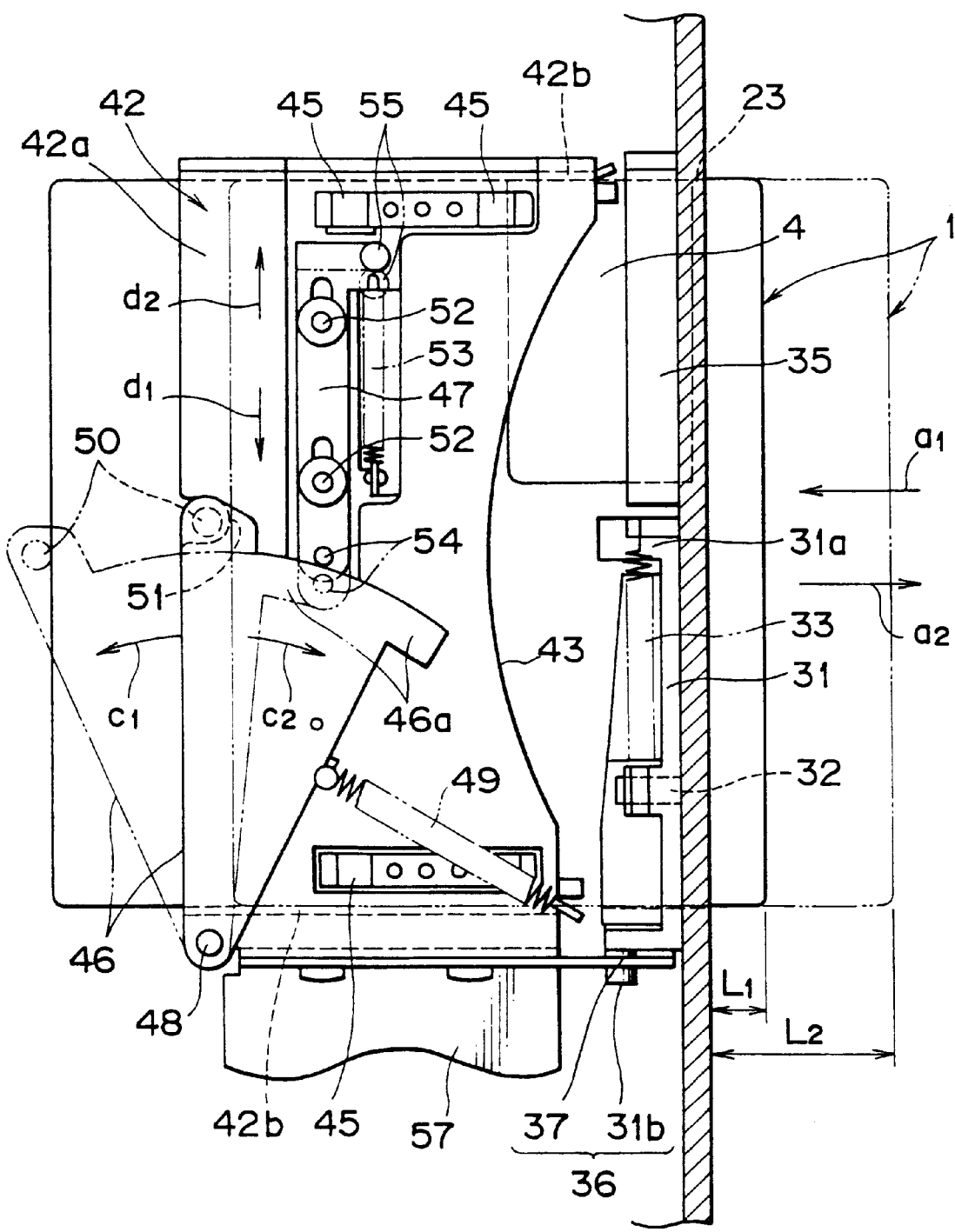
FIG. 7 is a partly cutout plan view for explaining a means for canceling the insertion inhibit mode of the insertion inhibit means of FIG. 6.

As shown in FIG. 6, a shutter opening small projection 44 for opening the shutter 4 of the MD cartridge 1 is provided at the internal side of one side plate 42b of the cartridge holder 42. Moreover, as shown in FIG. 7, at the upper part of the ceiling plate 42a of the cartridge holder 42, a couple of right and left cartridge holding plate springs 45, an eject lever 46 for cartridge eject and a lock lever 47 of such eject lever 46 are provided. The eject lever 46 is provided to freely rotate in the direction of the arrow marks c1, c2 within the horizontal plane via a fulcrum pin 48 and is urged to rotate in the direction of the arrow mark c2 by an eject spring 49 which is designed as a tensile coil spring extended toward the ceiling plate 42a. The eject pin 50 attached vertically at the lower part of the rear end of the cartridge eject lever 46 is projected to the lower side from the ceiling plate 42a. The eject pin 50 is placed in contact, from the direction of arrow mark c2, with the cutout portion 51 formed almost at the center of the rear end of the ceiling plate 42a to restrict the stop position of the eject lever 46 in the direction of the arrow mark c2. Moreover, the lock lever 47 is guided by a couple of guide pins 52 on the ceiling plate 42a to freely slide in the direction of arrow marks d1, d2 and is also urged to slide in the direction of arrow mark d1 with a lock spring 53 which is designed as a tensile coil extended toward the ceiling plate 42a. A lock pin 54 mounted on one end of this lock lever 47 is pushed, from the direction of arrow mark c1, to an arc-shaped arm 46a which rotates around the fulcrum pin 48 formed to the eject lever 46 and a lock reset pin 55 is mounted vertically on the other end of the lock lever 47.

As shown in FIG. 9 to FIG. 14, FIG. 22 to FIG. 24, the other side surface of the cartridge holder 42 is mounted, for the single-ended supporting, to the MD slider 57 formed of metal plate and this cartridge holder 42 is horizontally arranged at the position just at the rear side of the first insertion slot 23 explained above. In the main chassis 58 which is almost formed in a U-shape with a metal plate, two guide shafts 60 are extended horizontally in parallel to the directions of arrow marks a1, a2 as the loading direction to one side portion of the bottom plate 58a via a couple of front and rear supporting bases 59 and the MD slider 57 is mounted to freely slide in the direction of the arrow marks a1, a2 along the two guide shafts 60 via a couple of thrust bearings 61. Moreover, a timing belt 63 is also extended in parallel to the guide shafts 60 between a couple of front and rear timing pulleys 62 which are mounted to freely rotate to a couple of the front and rear supporting bases 59 and a part of the upper path of the timing belt 63 is fixed to the MD slider 57. When one timing pulley 62 is driven to rotate, via a gear train 65, by the MD loading motor 64 mounted on the bottom plate 58a of the main chassis 58, the timing belt 63 is driven to rotate in the direction of arrow marks a1, a2.

Namely, this MD loading apparatus 41 is structured in such a manner that the MD slider 57 is driven to slide in the direction of arrow marks a1, a2 along the two guide shafts 60 by driving to rotate the timing belt 63 in the direction of arrow marks a1, a2 with the MD loading motor 64 and thereby the cartridge holder 42 is moved in horizontal integration with the MD slider 57, in the direction of arrow marks a1, a2 along the loading center P11 (however, the loading center P11 is matched with the center P1 in the thickness direction and the center P2 in the width direction of the first and second insertion slots 23, 24) common to MD and CD.

Next, as shown in FIG. 15 to FIG. 23, FIG. 26 to FIG. 28, FIG. 30 to FIG. 32, the CD loading apparatus 71 is mounted horizontally between the upper end portions of both right and left side plates 58b of the main chassis 58 and is also mounted horizontally at the lower part of the CD mechanical chassis 72 which is formed of a metal plate as the supporting member. That is, the CD loading apparatus 71 is formed almost in a U-shape with a metal plate in parallel to the loading center P11 and a couple of right and left slider guides 73, 74 arranged almost symmetrically in both right and left sides are arranged horizontally at both right and left side positions of the cartridge holder 42. A couple of these right and left slider guides 73, 74 are engaged to freely slide with the three guide grooves 77, 78 respectively formed on the CD mechanical chassis 72 by three guide pins 75, 76 with flange mounted on the upper portions thereof and a couple of these slider guides 73, 74 are extended symmetrically to freely slide by the parallel movement in the direction of the arrow marks e1, e2 which is orthogonal to the loading center P11 at the lower position of the CD mechanical chassis 72.

Moreover, a couple of right and left CD sliders 79, 80 which are sliders formed of synthetic resin as almost angled poles are mounted to freely slide in the direction of arrow marks a1, a2 parallel to the loading center P11 along a couple of right and left slider guides 73, 74. At the surfaces 79a, 80a provided opposed with each other of a couple of right and left CD sliders 79, 80, a couple of right and left recessed grooves 81, 82 for holding the CD are formed horizontally in parallel to the loading center P11 and a couple of these right and left recessed grooves 81, 82 are horizontally provided opposed with each other just at the rear position of both right and left end portions of the second insertion slot 24 explained above.

In addition, a slider coupling plate 83 which is fixed to the upper end of one CD slider 79 and is extended in horizontal at the right angle toward the other CD slider 80 is engaged to freely slide in the direction of the arrow marks e1, e2 via the slide groove 85 with the slide projection 84 at a right angle of the loading center P11 integrally formed on the upper end of the other CD slider 80. That is, this slider coupling plate 83 couples a pair of these right and left CD sliders 79, 80 so that the couple of right and left CD sliders 79, 80 can simultaneously slide in the loading direction and eject direction (direction of arrow marks a1, a2) while allowing the relative slide of these sliders in the direction orthogonal to the loading center P11 (direction of arrow marks e1, e2).

At the inside of one slider guide 73, a CD loading motor 87 which is a slider driving means is mounted at the external position of one CD slider 79 and a rack 89 which is driven by the CD loading motor 87 via a gear train 88 that is formed parallel to the loading direction (direction of arrow marks a1, a2) along the external side surface of one CD slider 79. Therefore, one CD slider 79 is driven to slide in the direction of arrow marks a1, a2 parallel to the loading center P11 and the other CD slider 80 is driven to slide in the direction of arrow marks a1, a2 parallel to the loading center P11 in synchronization of one CD slider 79 via the slider coupling plate 83 by driving the rack 89 via the gear train 88 by the CD loading motor 87.

Figure 30:
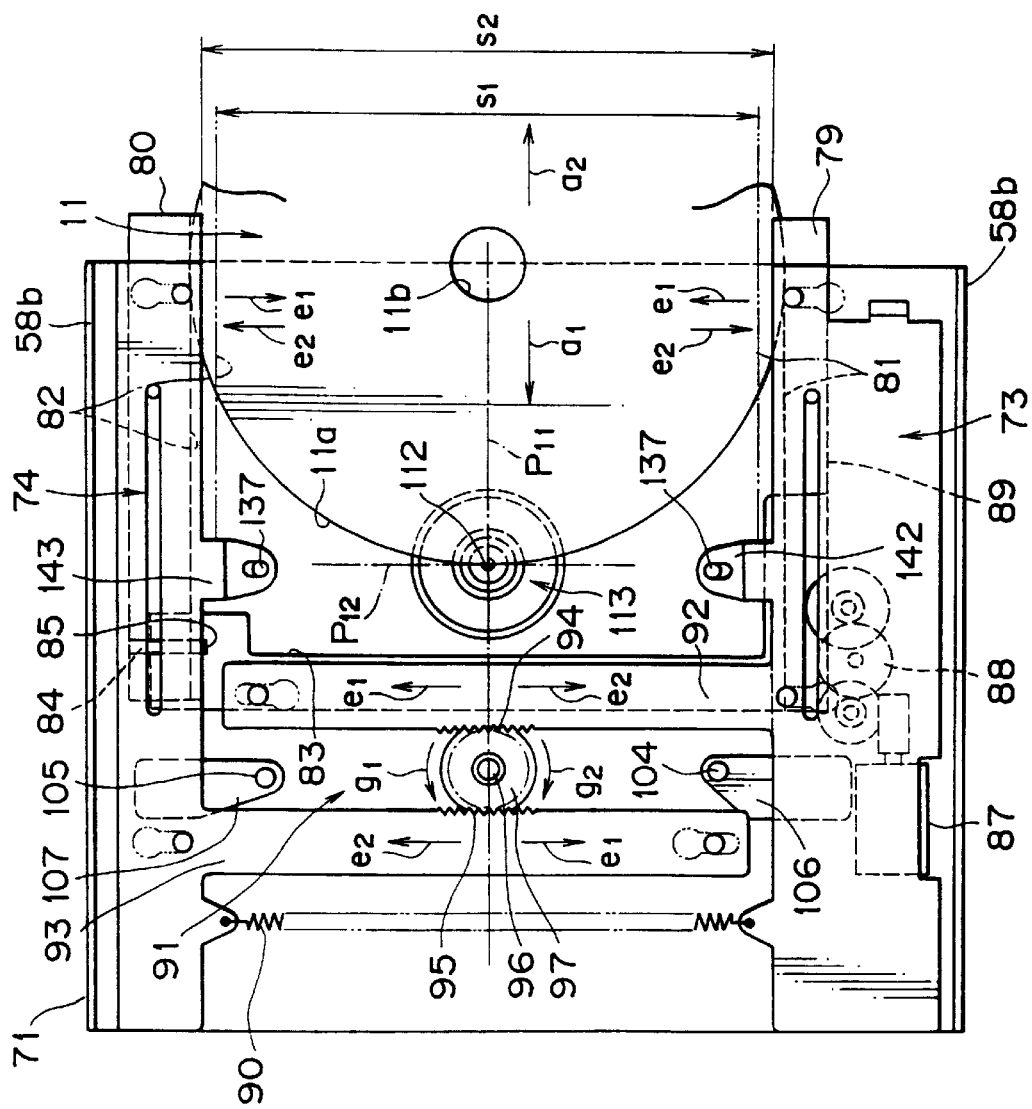
FIG. 30 is a plan view for explaining the slot-in condition to the CD loading apparatus.

Moreover, the CD hold spring 90 which is designed as a slide urging means formed of a tensile coil spring is extended over a couple of right and left slider guides 73, 74 orthogonal to the loading direction and this CD hold spring 90 urges a couple of right and left slider guides 73, 74 and a couple of right and left CD sliders 79, 80 to slide to relatively become close in the direction of arrow mark e1 orthogonal to the loading center P11. In addition, an interval between a couple of right and left CD sliders 79, 80 integrated to a couple of right and left slider guides 73, 74 is regulated to the minimum interval S1, as shown in FIG. 30. Under this minimum interval, an interval between the bottom surfaces 81a, 82a of a couple of right and left recessed grooves 81, 82 is set smaller than the diameter of CD 11.

Figure 16:
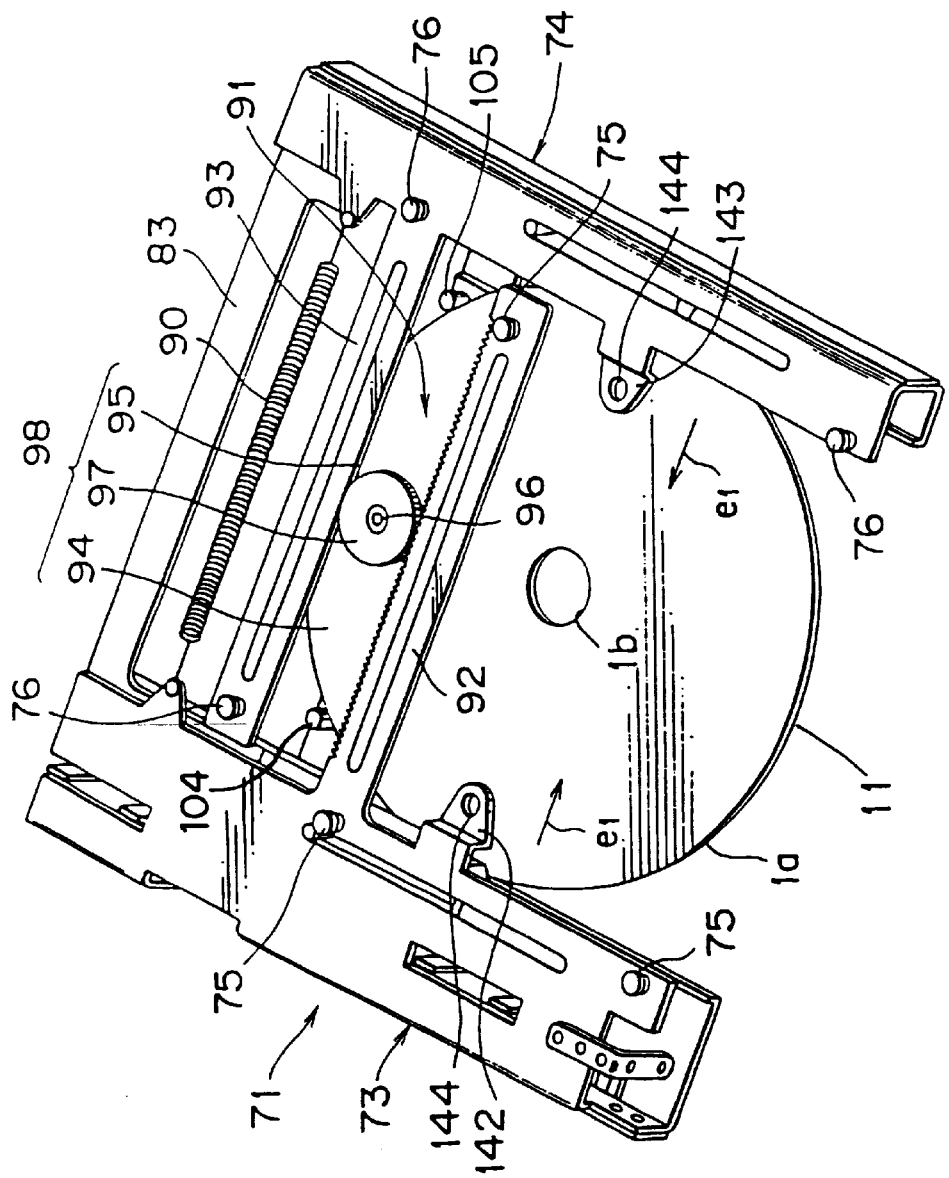
FIG. 16 is a perspective view for explaining a CD loading apparatus.
Figure 17:
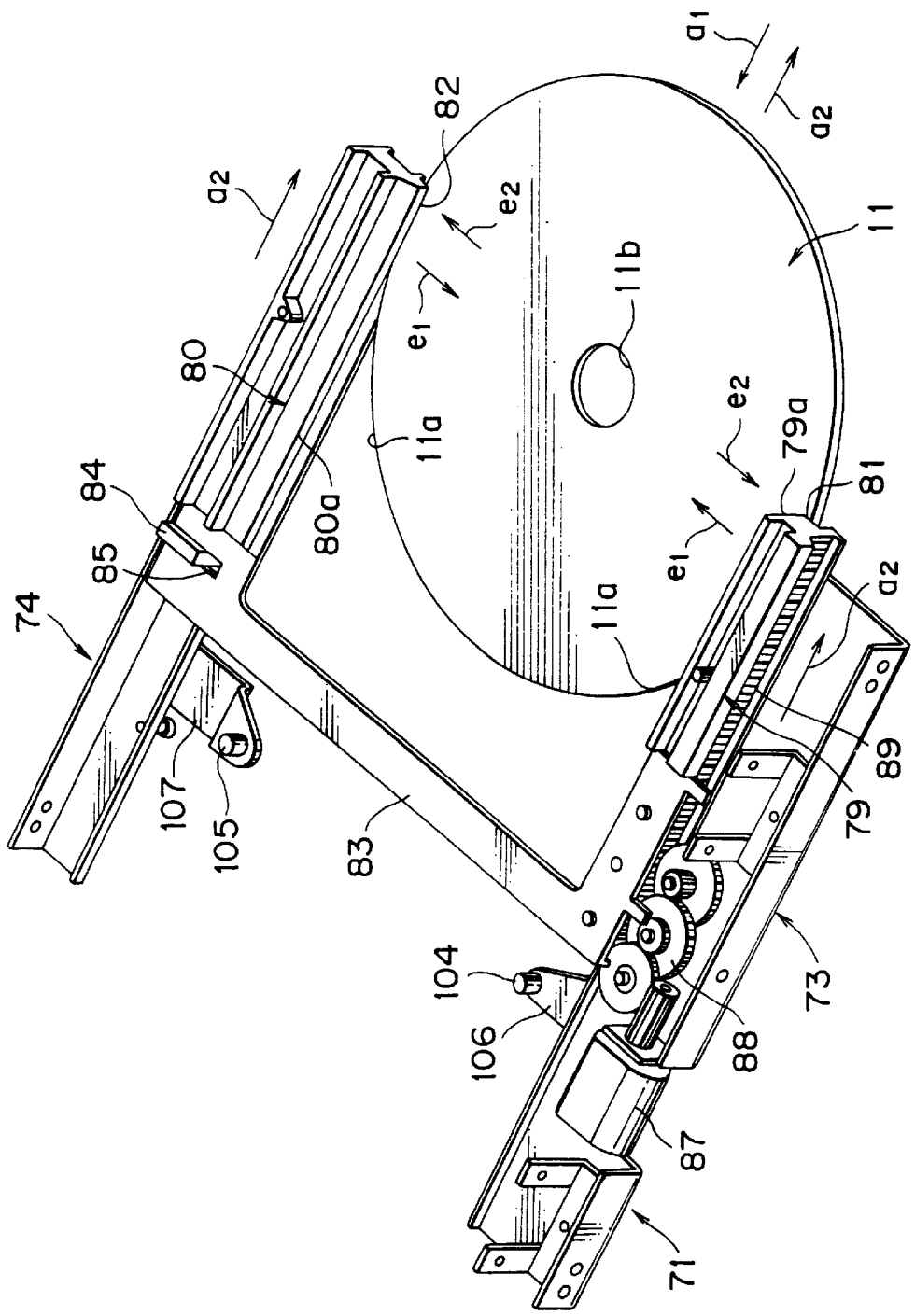
FIG. 17 is a perspective view for explaining the slot-in operation of CD to the CD loading apparatus explained above.
Figure 18:
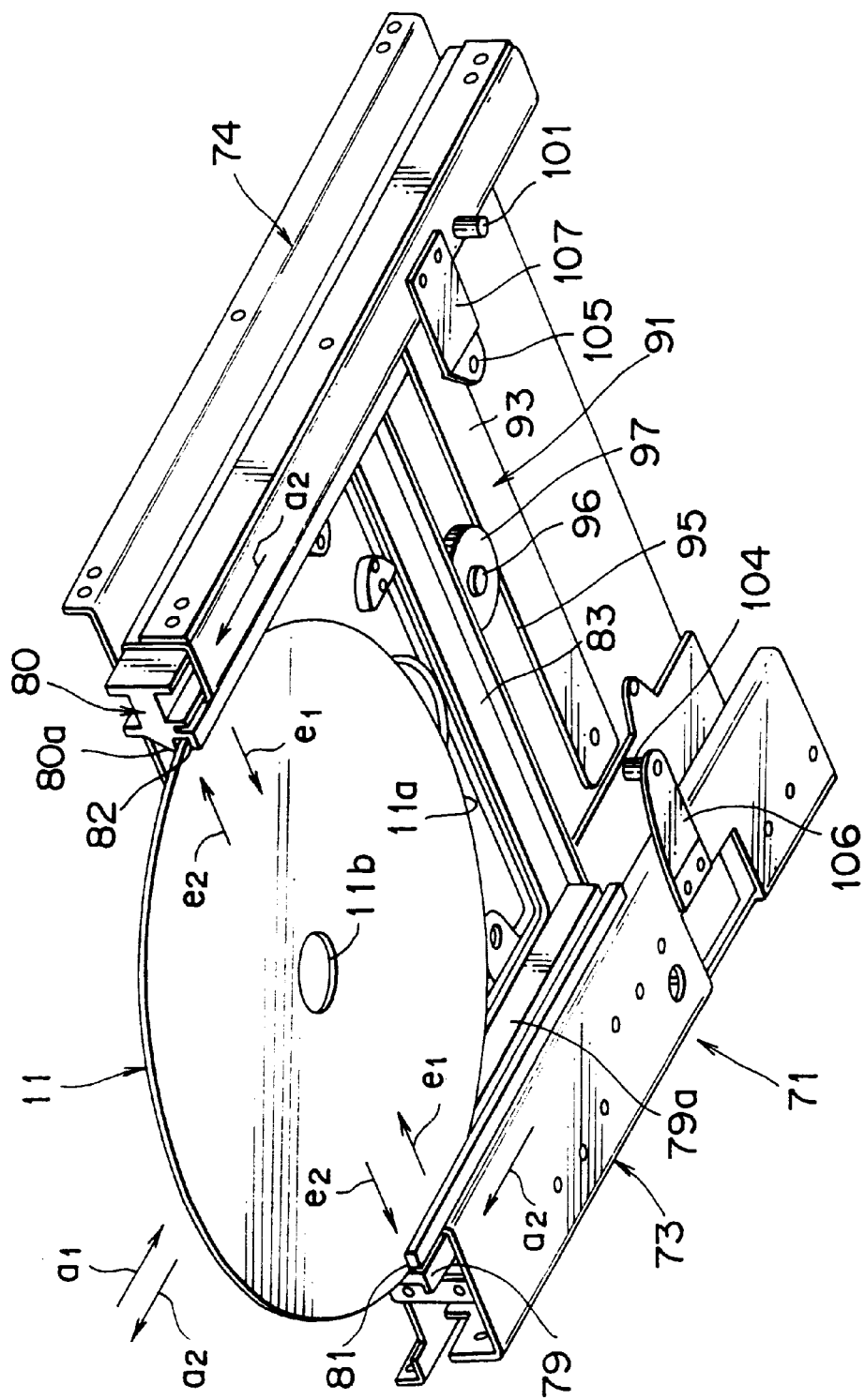
FIG. 18 is a perspective view of FIG. 17 observed from the lower side.
Figure 36:
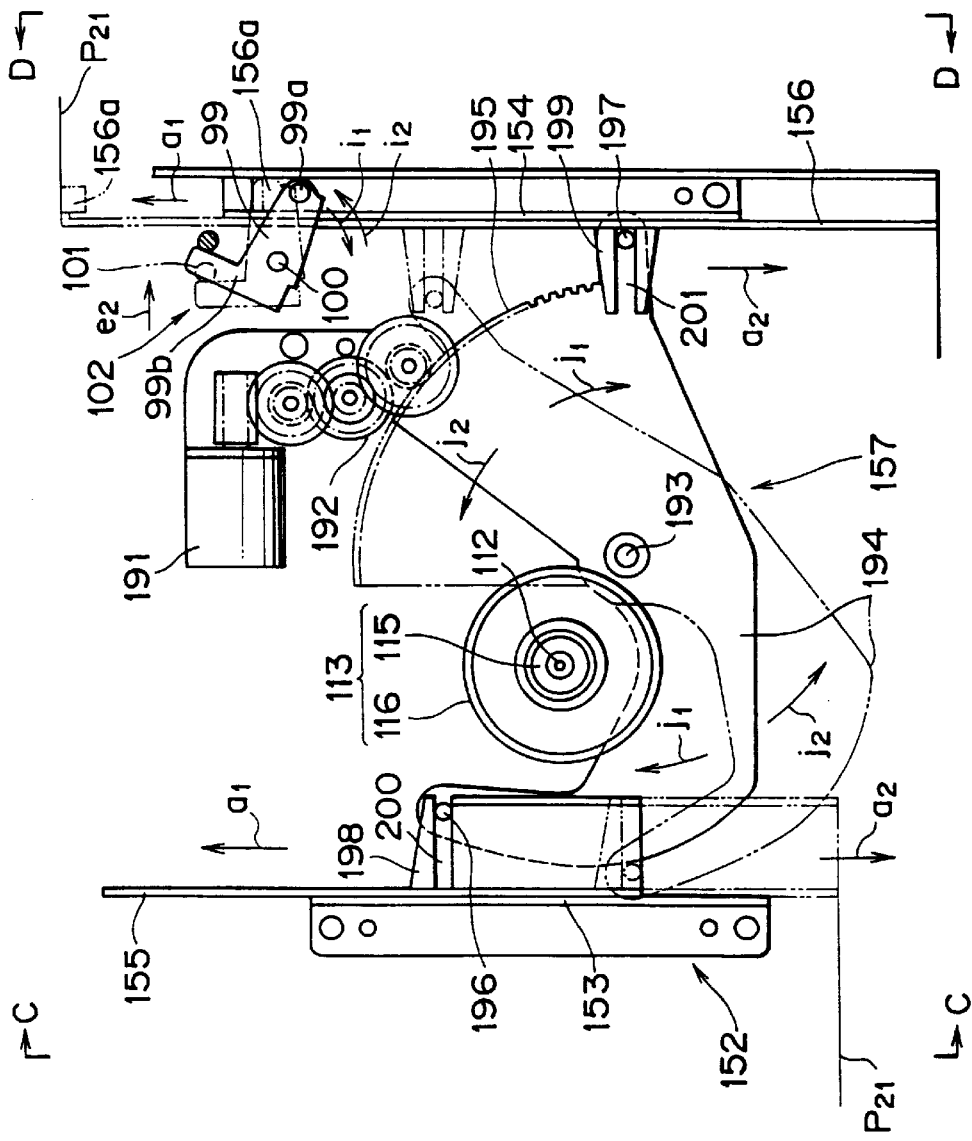
FIG. 36 is a plan view for explaining the mechanical deck and disc table lifting apparatus explained above.
Figure 37:
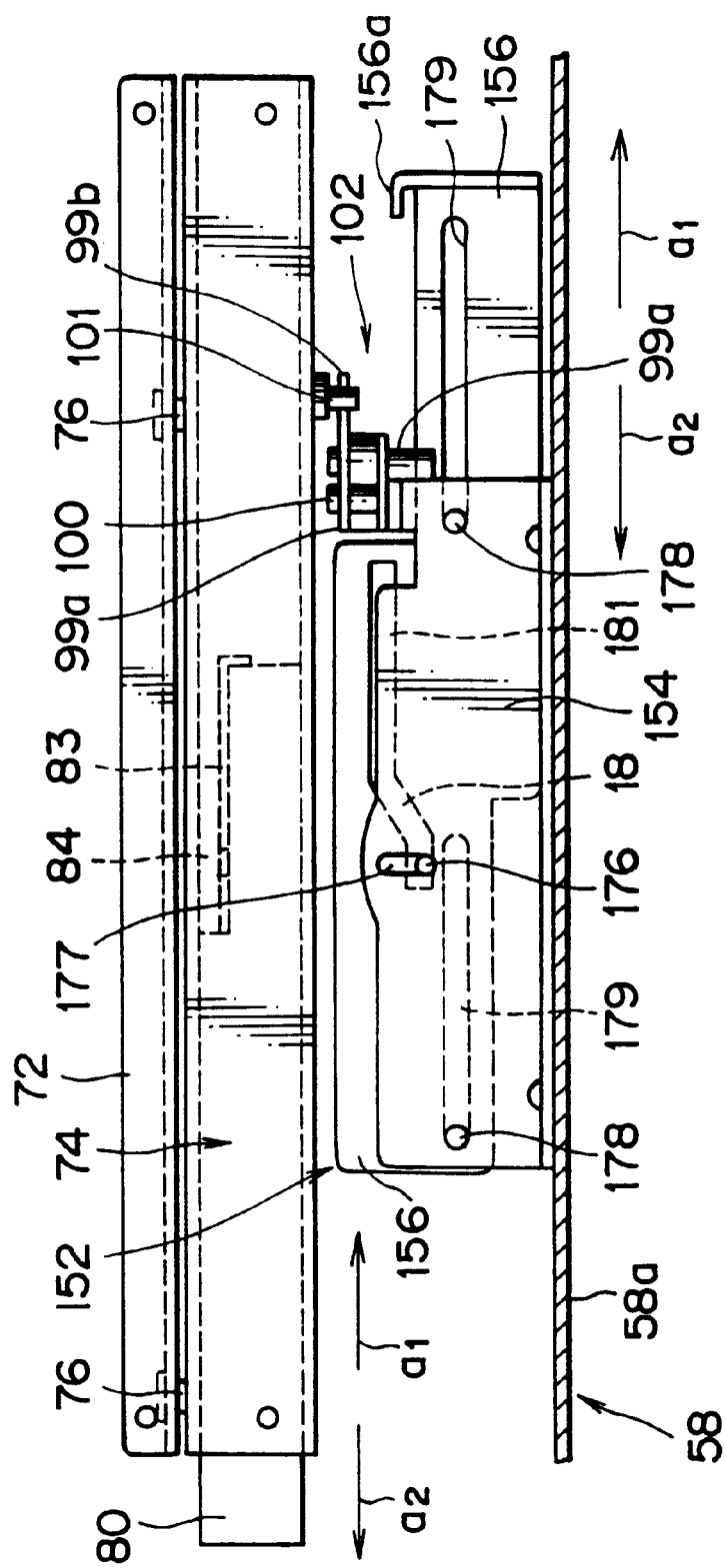
FIG. 37 is a partly cutout side elevation at the plane D—D.

Moreover, this CD loading apparatus 71 is provided with a CD opening mechanism 91 as shown in FIG. 30 which is a disc opening means to symmetrically open a couple of right and left slider guides 73, 74 and CD sliders 79, 80 in the direction of arrow mark e2 against the CD hold spring 90. This CD opening mechanism 91 is provided with a couple of right and left rack arms 92, 93 which are extended from the upper ends of a couple of right and left slider guides 73, 74 in the direction (directions of arrow marks e1, e2) orthogonal to the loading center P11 and are also arranged in parallel keeping an interval in the front and rear direction (direction of arrow marks a1, a2) a couple of racks 94, 95 which are formed in parallel along the opposed edges in the front and rear directions (directions of arrow marks a1, a2) of a couple of right and left rack arms 92, 93 and a rack pinion mechanism 98 as shown in FIG. 16, which is formed of a pinion 97 being arranged between a couple of right and left rack arms 92, 93, mounted to freely rotate via a fulcrum shaft 96 at the lower part of the CD mechanical chassis 72 and is engaged with a couple of racks 94, 95 at both sides thereof in the front and rear direction (direction of arrow marks a1, a2). In addition, as shown in FIG. 36 and FIG. 37, an opening drive mechanism 102, which is structured by a drive lever 99 of bell crank shape to be driven to rotate by the mechanical deck and spindle motor lifting apparatus 152 explained later and a pin 102 which is mounted in vertical at the lower part of the other slider guide 74 and is driven to slide in the direction of arrow mark e2 by the drive lever 99, is used in common.

This CD loading apparatus 71 is provided with a couple of right and left CD stoppers 104, 105 as the disc stoppers as shown in FIG. 16 to FIG. 20, FIG. 26, FIG. 30 to FIG. 32. A couple of these right and left CD stoppers 104, 105 are mounted vertically on the upper part of a couple of right and left stopper arms 106, 107 formed at the positions deviated in the direction of arrow mark a1 at the lower end portions of a couple of right and left slider guides 73, 74. Therefore, a couple of these right and left CD stoppers 104, 105 are structured to symmetrically slide in the direction of arrow marks e1, e2 integrally with a couple of right and left slider guides 73, 74.

Figure 10:
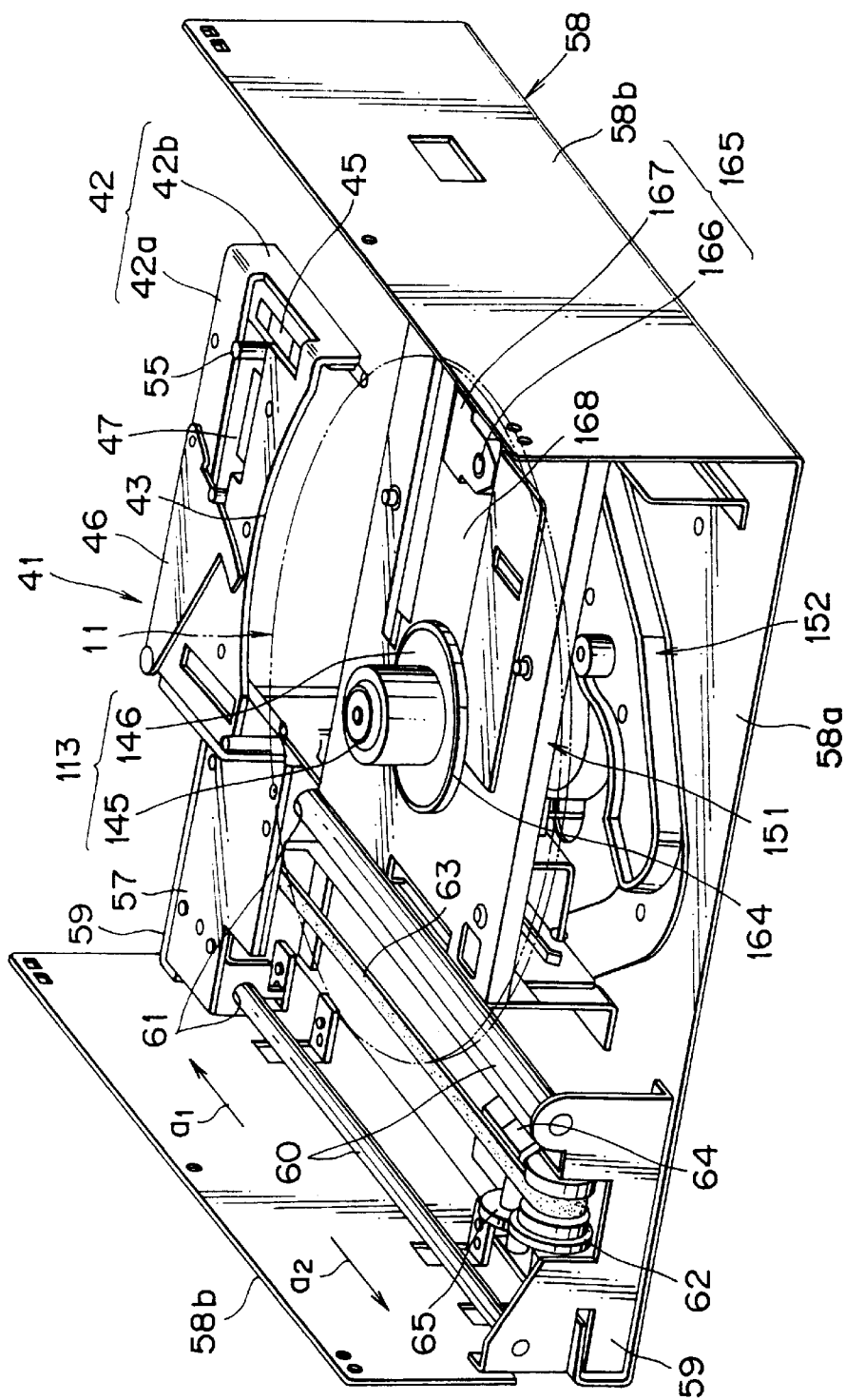
FIG. 10 is a perspective view for explaining the recording and/or reproducing mode of CD under the condition that the cartridge holder of FIG. 9 is evacuated.

The MD loading apparatus 41 and CD loading apparatus 71 are structured as explained above. As explained in regard to FIG. 2, in the CD priority condition where the power switch is turned ON and the CD lamp 27 lights, the cartridge holder 72 draws back to the evacuating position which is located at the latest position in the direction of arrow mark a1 as shown in FIG. 10, the CD loading path (space for loading the CD 11) provided by the CD loading apparatus 71 is opened and a couple of right and left CD sliders 79, 80 are slid in the direction of arrow mark a2 up to the eject position shown in FIG. 18 and FIG. 30.

Therefore, the CD loading is started by horizontally inserting the CD 11, by the slot-in system, in the direction of arrow mark a1 from the second insertion slot 24 of the front panel 22. In this case, under the condition that a couple of right and left CD sliders 79, 80 are relatively attracted in the direction of arrow mark a1 with the CD hold spring 90 as shown by a chain line in FIG. 30 and an interval between a couple of these right and left CD sliders 79, 80 is set to the minimum interval S1 smaller than the diameter of CD 11, both right and left sides of the external circumference 11a of the CD 11 inserted in the direction of arrow mark a1 from the second insertion slot 24 are inserted horizontally and directly by the slot-in system into a couple of right and left recessed grooves 81, 82 of a couple of right and left CD sliders 79, 80. As indicated by a solid line in FIG. 17 and FIG. 30, when the CD 11 is inserted up to the depth corresponding to the radius thereof into a couple of right and left recessed grooves 81, 82, the external circumference surface 11a of the CD 11 pushes symmetrically the bottom surfaces 81a, 82a (FIG. 26 and FIG. 27) of a couple of right and left recessed grooves 81, 82 in the direction of arrow mark e2. Thereby, a couple of right and left CD sliders 79, 80 are symmetrically opened in the direction of arrow mark e2 against the CD hold spring 90 integrally with a couple of right and left slider guides 73, 74 in order to expand the interval between a couple of right and left CD sliders 79, 80 up to the intermediate interval S2 from the minimum interval S1.

The CD 11 is held between a couple of right and left CD sliders 79, 80 with a repulsion force in the direction of arrow mark e1 of the CD hold spring 90. In this case, since a couple of right and left CD sliders 79, 80 can be smoothly widened naturally against the CD hold spring 90 with the cam effect by the arc surface as the external circumference surface 11a of the CD 11, the CD 11 can always be inserted smoothly (namely, easily with a light force) in the direction of arrow mark a1 into the recessed groves 81, 82 of a couple of right and left CD sliders 79, 80 from the second insertion slot 24. Moreover, since the CD 11 is held with a spring force of the CD hold spring 90 between a couple of right and left CD sliders 79, 80, the CD 11 can always be held stably with almost a constant force even if the diameter of CD 11 is a little fluctuated.

When the CD 11 is held between a couple of right and left CD sliders 79, 80 as explained above, a slide position of one slider guide 73 in the direction of the arrow mark e2 is detected by a CD-in sensor (not illustrated) provided at the lower part of the CD mechanical chassis 72 for detection of the insertion of a CD.

Thereby, a rack 89 is driven by the CD loading motor 87 via a gear train 88, a couple of right and left CD sliders 79, 80 are driven to slide in the direction of arrow mark a1, the CD 11 is then inserted into the inside of the optical disc drive 21 from the second insertion slot 24 and it is then loaded horizontally in the direction of the arrow mark a1 along the loading center P11.

Figure 19:
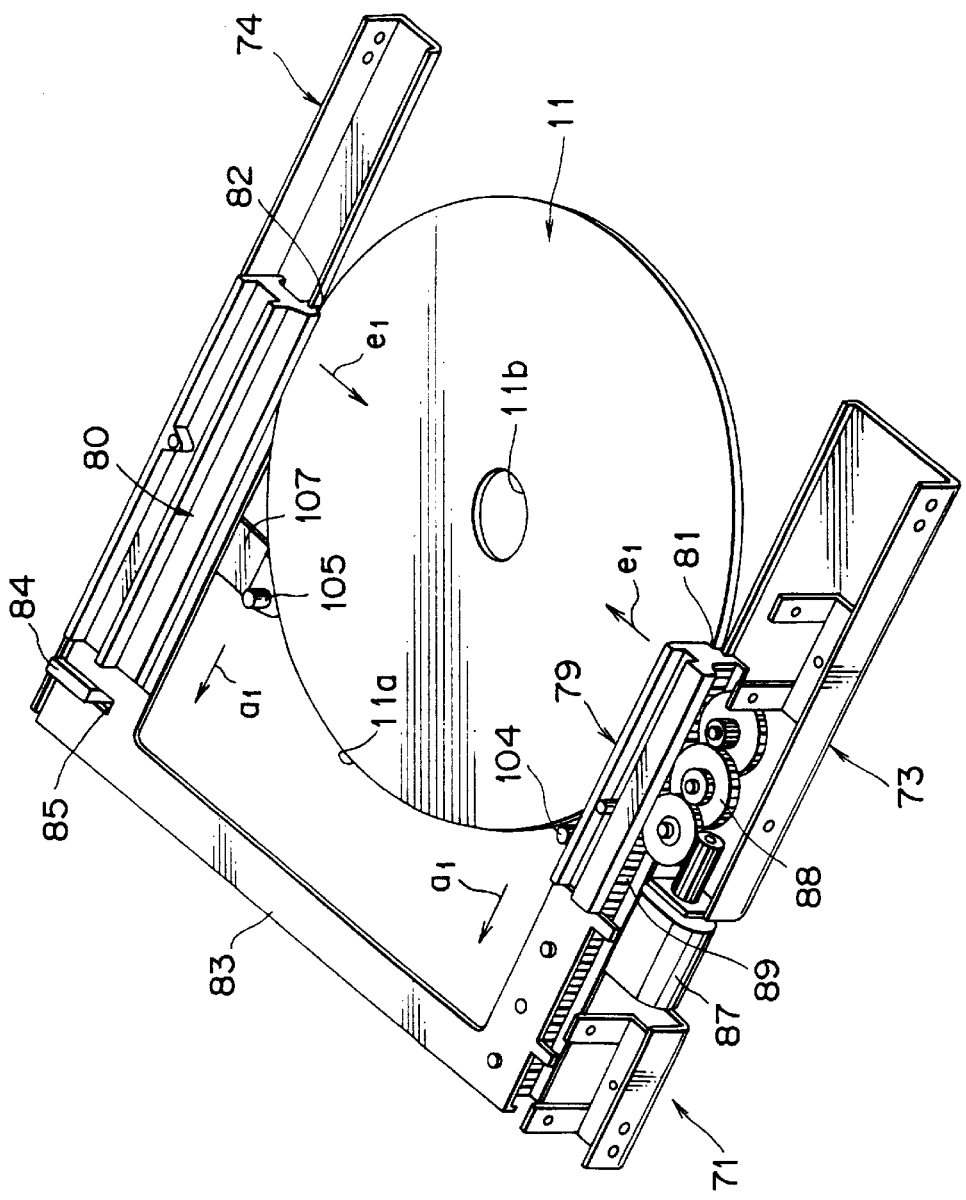
FIG. 19 is a perspective view for explaining the loading end condition of CD by the CD loading apparatus explained above.
Figure 20:
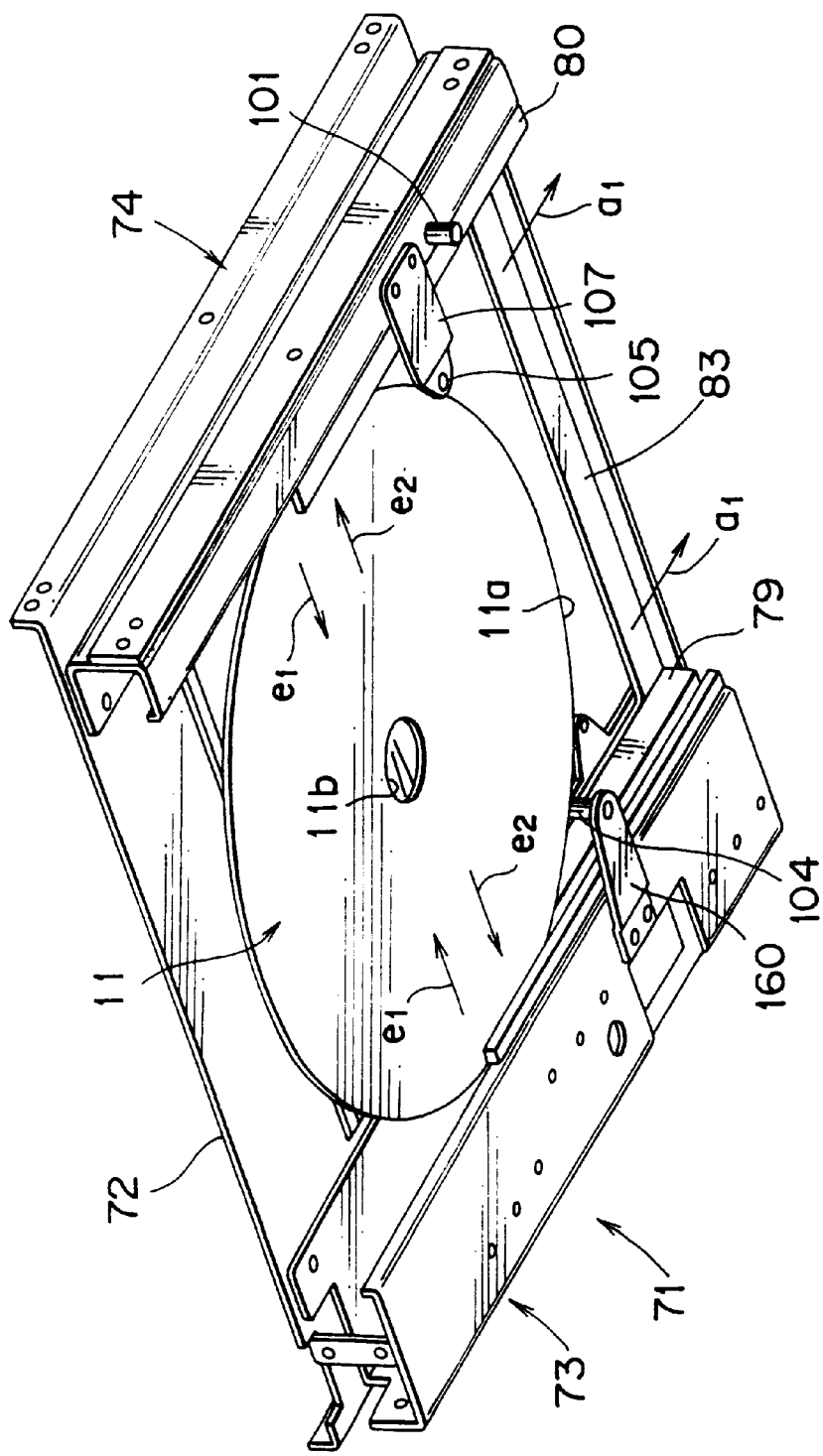
FIG. 20 is a perspective view of FIG. 19 observed from the lower side.
Figure 31:
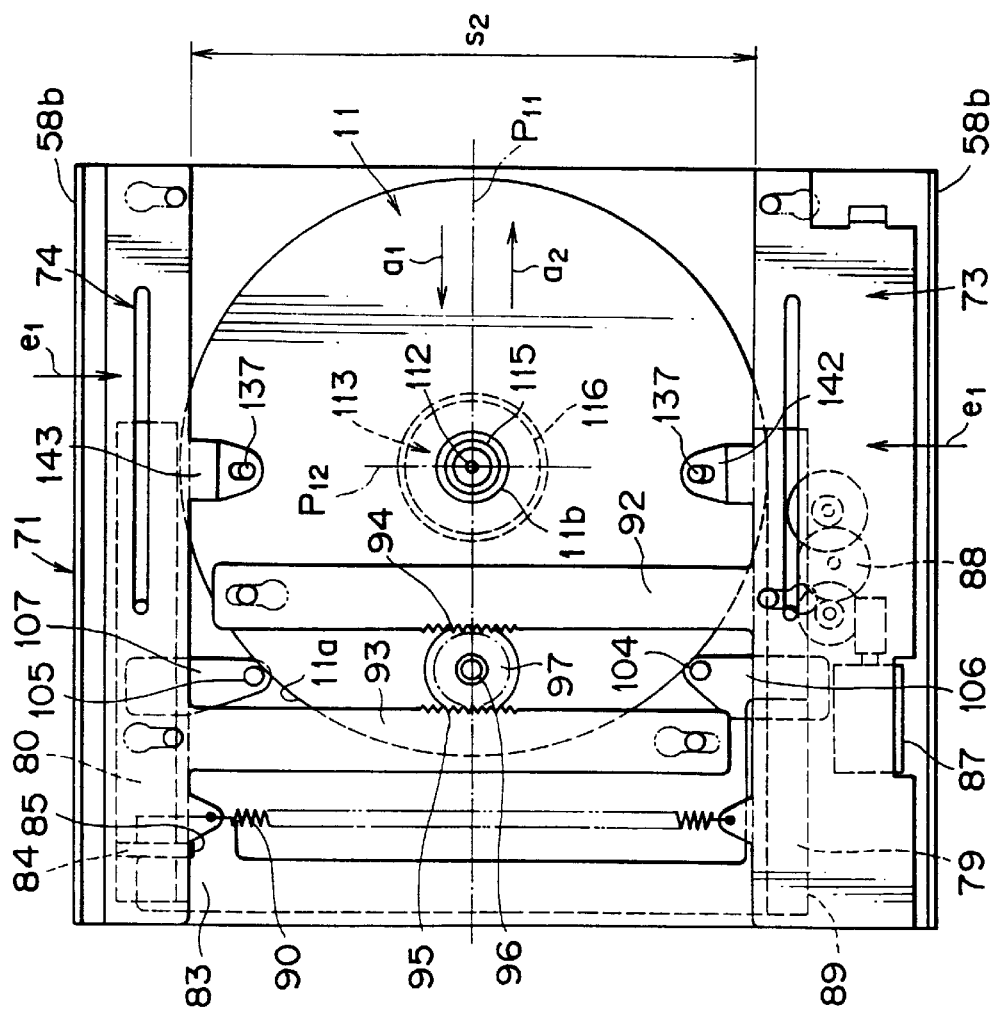
FIG. 31 is a plan view showing the CD loading end condition by the CD loading apparatus.

When the CD 11 is loaded up to the chucking center P12 common to MD and as, CD shown in FIG. 19, FIG. 20 and FIG. 31, the positions near both right and left sides of the external circumference surface 11a of the CD 11 are placed in contact in the direction of arrow mark a1 with a couple of right and left CD stoppers 104, 105 and thereby the CD 11 is stopped at the chucking center P12 thereof. Immediately after the stop of the CD 11, the slide position in the direction of the arrow mark a1 of one CD slider 79 is detected by the CD loading sensor (not illustrated) provided at one slider guide 73, the CD loading motor 87 stops and the CD loading operation is completed.

Figure 32:
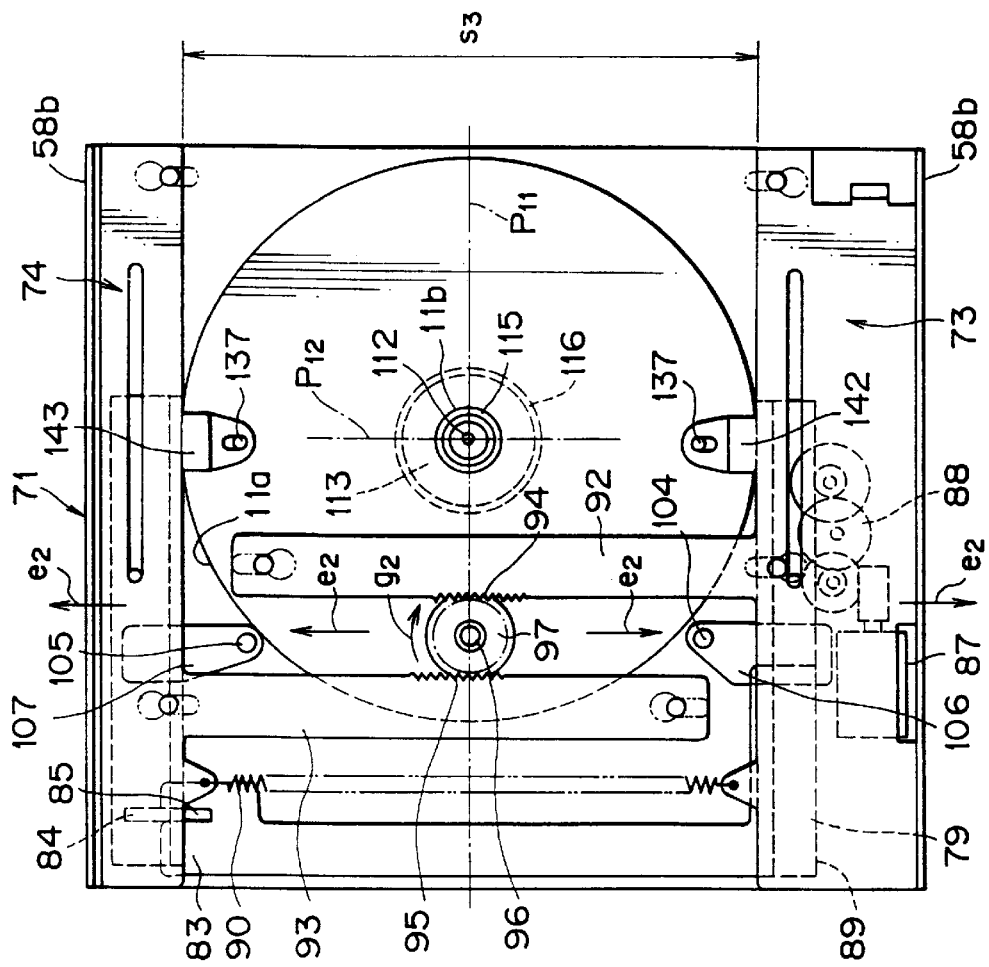
FIG. 32 is a plan view showing the hold canceling condition after the CD loading end by the CD loading apparatus.

After completion of the CD loading operation, the CD table 116 is attached to the CD 11 from the lower side by the mechanical deck and spindle motor lifting apparatus 152. After the loading of the CD 11 to the CD table, an open drive lever 99 shown in FIG. 36 and FIG. 37 of the CD open mechanism 91 drives the pin 101 to be driven of the other slider guide 74 in the direction of the arrow mark e2. Thereby, as shown in FIG. 32, the other slider guide 74 is driven to slide in the direction of arrow mark e2, a pinion 97 is driven to rotate in the direction of arrow mark g2 by the rack 95, one slider guide 73 is driven to slide in the direction of arrow mark e2 and a couple of right and left CD sliders 79, 80 are symmetrically and forcibly opened in the direction of arrow mark e2 integrally with a couple of right and left slider guides 73, 74. The interval between a couple of these right and left CD sliders 79, 80 is expanded to the maximum interval S3 which is sufficiently larger than the diameter of the CD 11 from the intermediate interval S2 shown in FIG. 31, a couple of these right and left recessed grooves 81, 82 are removed in the direction of arrow mark e2 of the external circumference surface 11a of CD 11, thereby the CD 11 is freed from a couple of right and left CD sliders 79, 80 and a couple of right and left CD stoppers 104, 105 are isolated in the direction of arrow mark e2 from the external circumference surface 11a of CD 11. Therefore, after the CD is freed, the CD 11 can be driven to rotate with the CD table 116 explained later without any contact with a couple of CD sliders 79, 80 and stoppers 104, 105.

For ejection of the CD 11 after recording and/or reproducing to be explained later, when a user turns ON the eject switch 29, a couple of right and left CD slider guides 79, 80 are closed in the direction of arrow mark e1 maintaining the intermediate interval S2 shown in FIG. 30 with the CD hold spring 90 with the inverse operation for the CD loading operation to hold again the both right and left sides of the external circumference surface 11a of CD 11 within a couple of right and left recessed grooves 81, 82, and thereafter a couple of these right and left CD sliders 79, 80 are driven to slide simultaneously in the direction of arrow mark a2 up to the eject position shown in FIG. 30 with the CD loading motor 87 to push the CD 11 in the direction of arrow mark a2 to the outside from the second insertion slot 24 of the front panel 22. Thereby, a user can remove the CD 11 in the direction of arrow mark a2 at the external side of the front panel 22 by picking up the CD 11 with fingers.

Next, at the time of loading an MD, as explained in regard to FIG. 3, when a user depresses the selection switch 28 to light up the MD lamp 26, the MD priority condition can be set up. Thereby, the MD slider 57 is driven, via the timing belt 63 by the MD loading motor 64, to slide in the direction of arrow mark a2 along the two guide shafts 60 up to the position shown in FIG. 13 and FIG. 7 from the position shown in FIG. 9 and thereby the cartridge holder 42 is pulled in the direction of arrow mark a2 up to the eject position shown in FIG. 13 and FIG. 7 from the evacuating position shown in FIG. 9.

Figure 13:
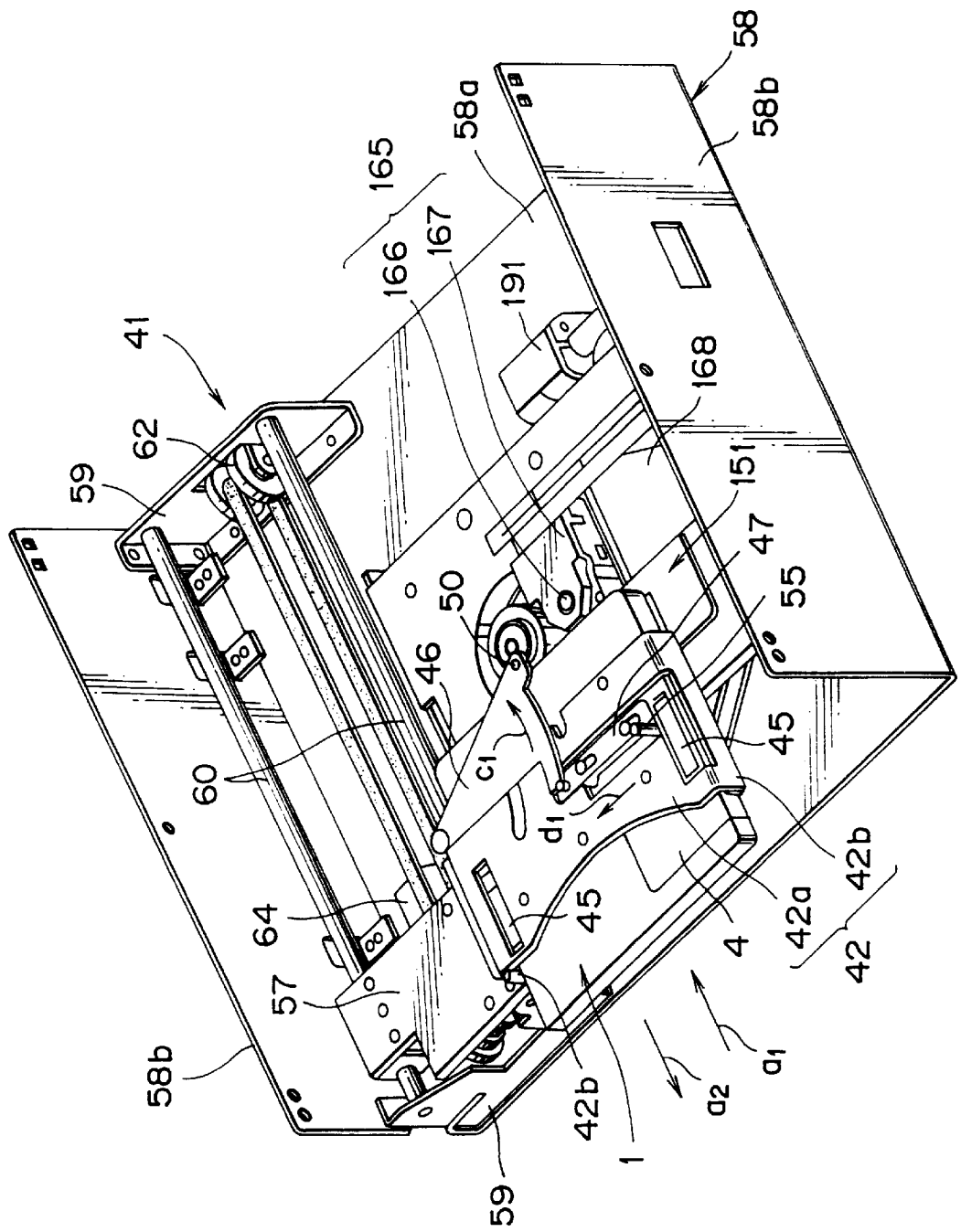
FIG. 13 is a perspective view for explaining the slot-in condition of the MD cartridge into the cartridge holder of the MD loading apparatus.

Therefore, the MD loading is started by horizontally inserting by the slot-in method, the MD cartridge 1 in the direction of the arrow mark a1 from the first insertion slot 23 of the front panel 22. In this case, as shown in FIG. 13, the MD cartridge 1 inserted horizontally in the direction of arrow mark a1 from the first insertion slot 23 is inserted continuously and horizontally in the direction of arrow mark a1 between both right and left side plates 42b at the lower part of the ceiling plate 42a of the cartridge holder 42 by the slot-in method and thereby the shutter 4 of the MD cartridge 1 is opened in the direction of arrow mark a2 with a small projection 44 as shown in FIG. 6 for opening the shutter, the eject pin 50 is pushed in the direction of arrow mark a1 by the MD cartridge 1 inserted as shown by a chain line in FIG. 7 and the eject lever 46 is rotated in the direction of arrow mark c1 against the eject spring 49. When the MD cartridge 1 is inserted in the direction of arrow mark a1 up to the predetermined position in the cartridge holder 42, the MD cartridge 1 is stopped by the small projection 44 for shutter opening and almost simultaneously the lock lever 47 is slid in the direction of arrow mark d1 by the lock spring 53, the lock pin 54 is engaged with the end part of the arc-shape arm 46a of the eject lever 46 from the direction of arrow mark d1 and such eject lever 46 is locked at the rotating position indicated by a chain line in FIG. 7. Here, the sliding position in the direction of arrow mark d1 of the lock lever 47 is detected by the MD-in sensor (not illustrated) to detect insertion of the MD. The MD cartridge 1 inserted into the cartridge holder 42 is pressed from the upper side on the lower edges of both right and left side plates 42b by a couple of right and left cartridge clamping plate springs 45 and then held as it is.

Figure 11:
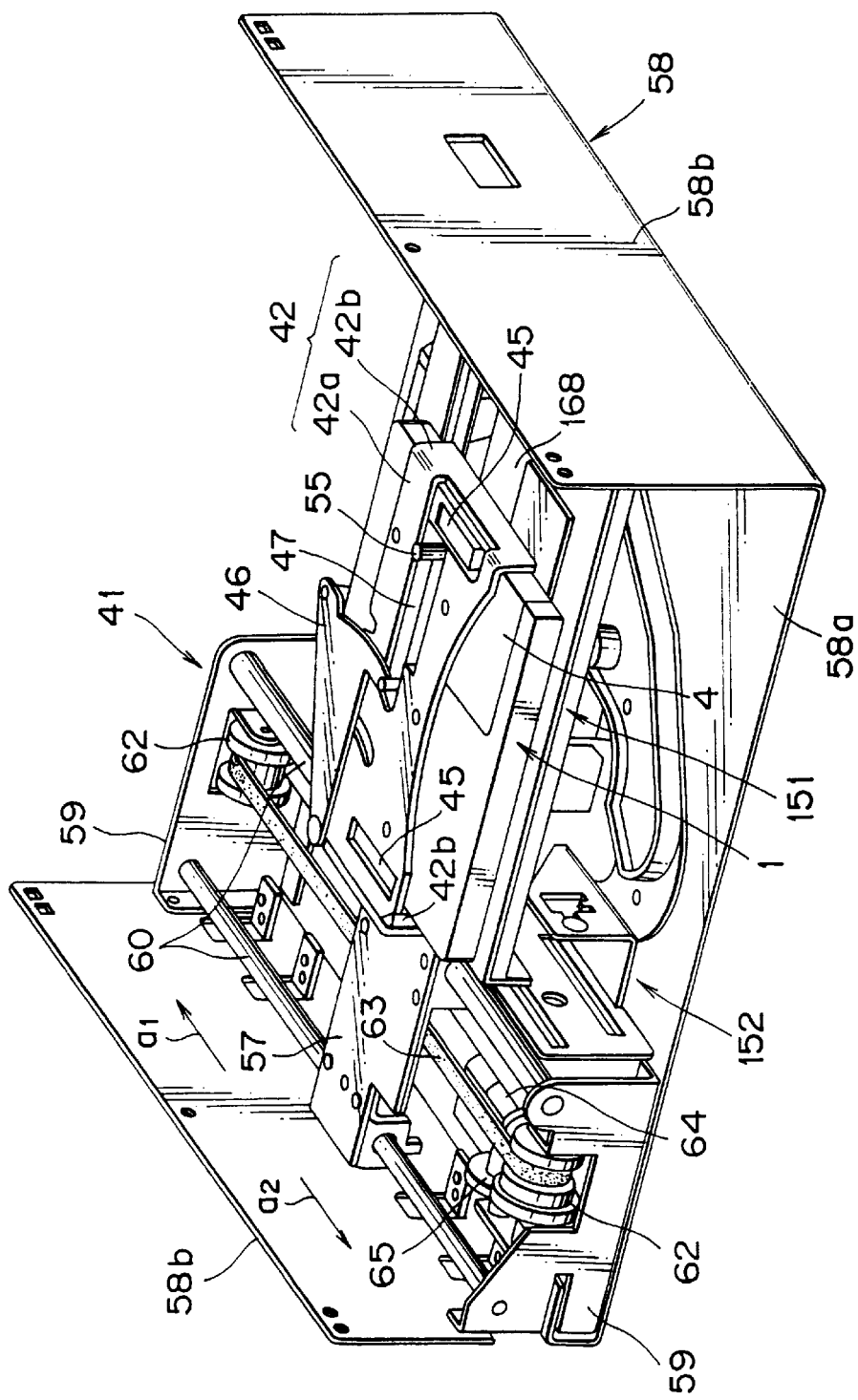
FIG. 11 is a perspective view for explaining the loading end condition of the MD cartridge loaded by the MD loading apparatus.
Figure 12:
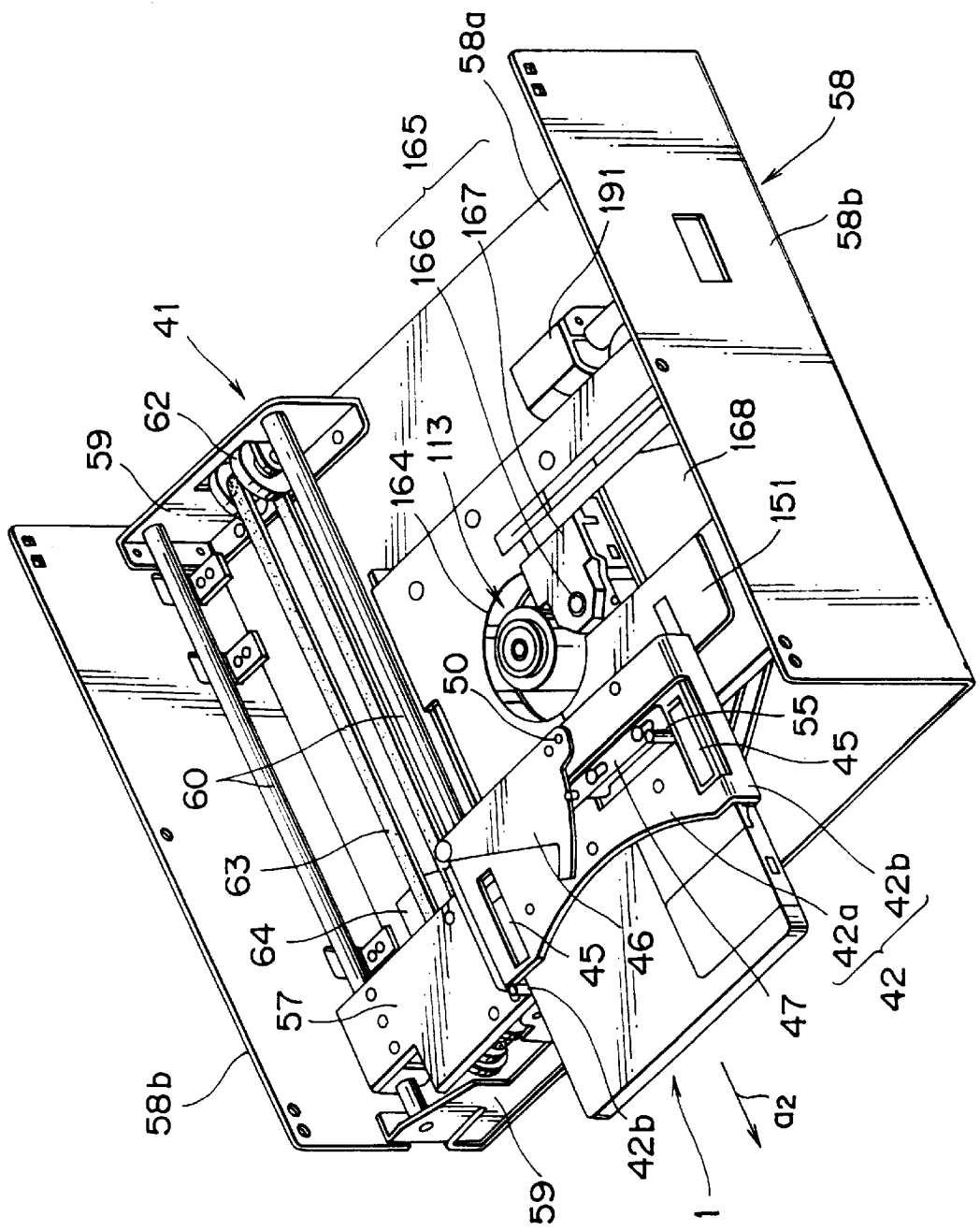
FIG. 12 is a perspective view for explaining the ejected condition of the MD cartridge.

Accordingly, the MD slider 57 is driven to slide in the direction of arrow mark a1 via the timing belt 63 by the MD loading motor 64, the MD cartridge 1 is pulled in the direction of arrow mark a1 by the cartridge holder 42 and thereby the MD cartridge 1 is pulled to the inside of optical disc drive 21 from the first insertion slot 23 and is loaded horizontally in the direction of arrow mark a1 along the loading center When the MD cartridge 1 is loaded up to the chucking center P12 common to MD and CD indicated by the chain line in FIG. 11 and FIG. 32, the slide position of the MD slider 57 is detected by the MD loading sensor (not illustrated), and the MD loading motor 64 is stopped to complete the MD loading operation.

The MD table 115 is loaded, from the lower side, into the center hole 2a of the MD2 within the MD cartridge 1 by the mechanical deck and spindle motor lifting apparatus 152 explained later and thereby the MD2 can be driven to rotate within the MD cartridge 1 by means of the MD table 115.

Figure 14:
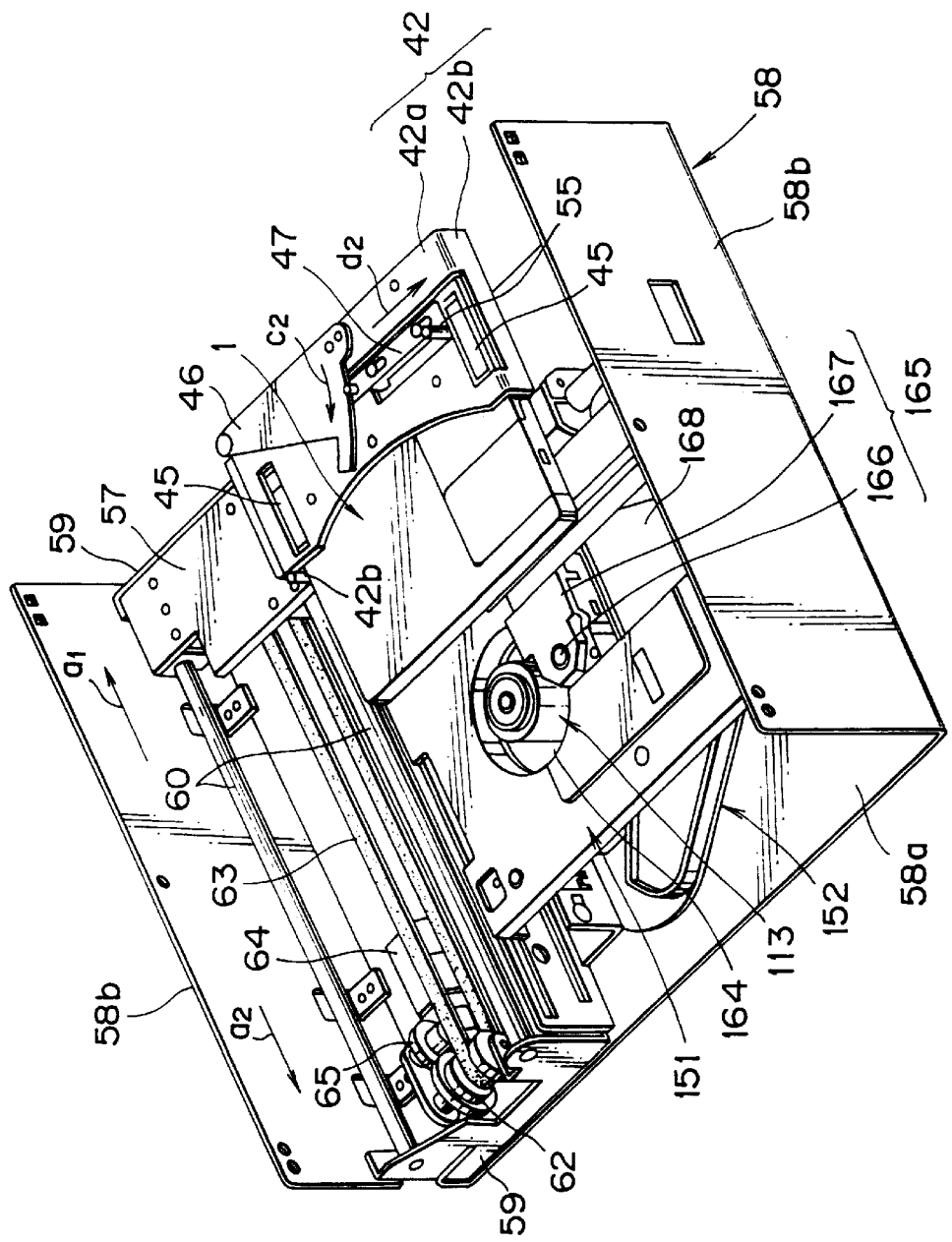
FIG. 14 is a perspective view for explaining the pushing operation of the MD cartridge from the cartridge holder to be performed during the ejecting operation of the MD cartridge.

When a user turns ON the eject switch 29 at the time of ejecting MD2 after recording and/or reproducing explained later, the cartridge holder 42 is once driven, by the MD loading motor 64, to slide in the direction of the arrow mark a1 up to the evacuating position shown in FIG. 14 integrally with the MD slider 57, the lock reset pin 55 shown in FIG. 7 is driven to slide in the direction of arrow mark d2 by a lock reset cam (not illustrated) provided at the lower part of the CD mechanical chassis 72 and the lock lever 47 is driven to slide in the direction of arrow mark d2 against the lock spring 53.

Thereby, the lock pin 54 of the lock lever 47 is removed toward the direction of arrow mark d2 from the arc-shape arm 46a of the eject lever 46 to reset the lock of the eject lever 46. Accordingly, the eject lever 46 is driven, by the eject spring 49, to rotate in the direction of arrow mark c2 up to the position indicated by a solid line from the position indicated by a chain line in FIG. 7. As a result, the MD cartridge 1 is pushed for a constant amount in the direction of arrow mark a2 from the cartridge holder 42 as shown in FIG. 14 by means of the eject pin 50 of the eject lever 47.

The slide position of the lock lever 47 in the direction of arrow mark d2 is detected by a sensor (not illustrated), the MD loading motor 64 is thereby driven to rotate inversely, the cartridge holder 42 is driven to slide, integrally with the MD slider 57, in the direction of arrow mark a2 up to the eject position shown in FIG. 13 and the MD cartridge 1 is pushed in the direction of arrow mark a2 from the first insertion slot 23 of the front panel 22. In this case, since the MD cartridge 1 is previously pushed for the constant amount in the direction of arrow mark a2 for the cartridge holder 42, the MD cartridge 1 can be pushed as shown in FIG. 7 so that it can be projected in the amount L2 sufficiently larger than the amount L1 of projection of the front panel 22 to the external side when the MD cartridge 1 is inserted as explained above. Here, a user can easily remove the MD cartridge 1 projected in such large amount L2 in the direction of arrow mark a2 by picking up it with her or his fingers.

(3) Explanation About Disc Table

Next, as shown in FIG. 21 to FIG. 35, a spindle motor 111 is vertically provided upward at the position just under the chucking center P12 common to MD and CD on the loading center P11 common to MD and CD at the lower position of the loading path of MD cartridge 1 and CD 11 of the MD loading apparatus 41 and CD loading apparatus 71 and a disc table 113 is deposited with pressure at the external circumference of the upper end of the spindle 112 of the spindle motor 111. Moreover, as shown in FIG. 25 and FIG. 29, this disc table 113 is formed of synthetic resin, the MD table 115 is horizontally integrated as the first disc table of a smaller diameter on the upper end surface of the column type disc table body 114 and the CD table 116 is horizontally integrated as the second disc table of a larger diameter at the external circumference of the lower end of the disc table body 114. Moreover, at the center on the MD table 115, the centering guide 117 of a smaller diameter is integrally formed concentrically and a concentric magnet 118 is horizontally buried within the centering guide 117. The chamfered area 119 is formed at the external circumference of the MD table 115.

Therefore, this disc table 113 is structured to integrally form, in the two stages of upper and lower stages, the MD table 115 of a small diameter and the CD table 116 of a large diameter to the column type disc table body 114. Therefore, two kinds of disc type recording media of MD 2 and CD 11 can be selectively chucked and driven to rotate by one disc table 113 as will be explained later.

(4) Explanation About Chucking Pulley

Next, as shown in FIG. 21 and FIG. 22, FIG. 24, FIG. 28 and FIG. 29, a chucking pulley 121 is vertically provided at the position just above the disc table 113 at the upper position of the loading path of MD cartridge 1 and CD 11 of the MD loading apparatus 41 and CD loading apparatus 71. As shown in FIG. 29, this chucking pulley 121 is formed of synthetic resin and a CD chucking flange 123 is horizontally formed at the external circumference of the lower end of the cylindrical chucking pulley body 122. The internal side of the chucking pulley body 122 is formed to a cylindrical inserting hole 124 to which the disc table body 114 of the disc table 113 is relatively inserted from the lower side and the tapered surface 125 which is extended toward the lower side is formed at the lower end side of the inserting hole 124. A disc type upper flange 127 is engaged, by means of the center hole 128, with the center pin 126 integrally formed at the center of the horizontally closed upper end portion 122a of the chucking pulley body 122 and is then placed horizontally and both upper flange 127 and annular yoke 129 horizontally built in the upper end portion of the inserting hole 124 are tightened in common with two or three fixing screws 130 provided through the upper end portion 122a of the chucking pulley body 122 and are fixed horizontally at the upper end portion 122a.

As shown in FIG. 15, FIG. 21 and FIG. 22, FIG. 24 and FIG. 28, the chucking pulley lifting apparatus 131 is mounted to the upper part of the CD mechanical chassis 72.

Figure 15:
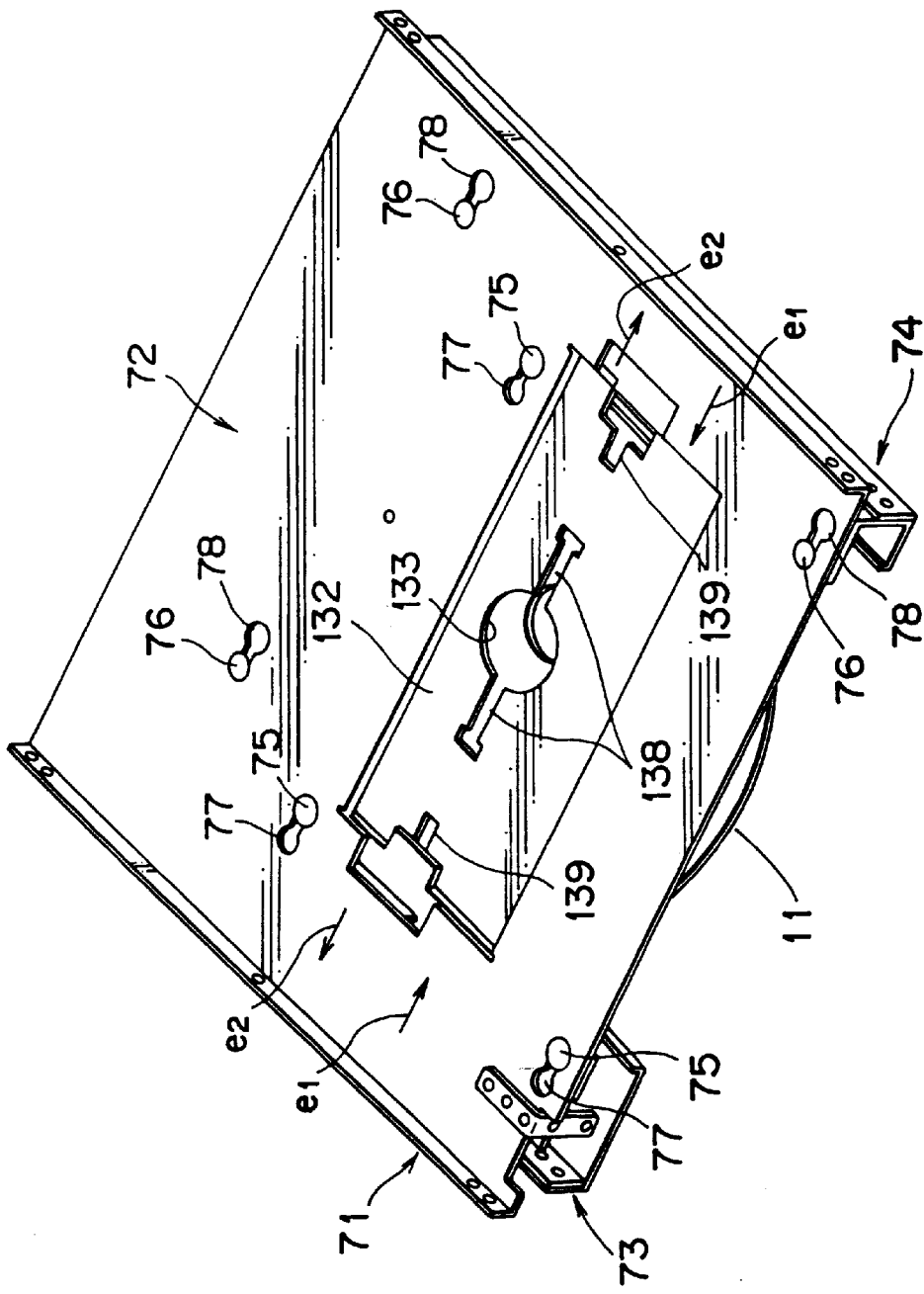
FIG. 15 is a perspective view for explaining a CD mechanical chassis.

Namely, an almost rectangular parallelopiped recess 132 is formed by the pressing method in the longer length in the direction orthogonal to the loading direction at the chucking pulley mounting position of the CD mechanical chassis 72 and a circular chucking pulley mounting hole 133 is formed at the center of the recess 132 (refer to FIG. 15). Under the condition that the chucking pulley 121 is provided vertically through the chucking pulley mounting hole 133 with the chucking pulley body 122 with sufficient play, the CD chucking flange 123 and upper flange 127 are arranged vertically in the recess 132 and the chucking pulley 121 is lifted freely in the directions of arrow marks h1, h2 as the vertical direction for the CD mechanical chassis 72.

Figure 21:
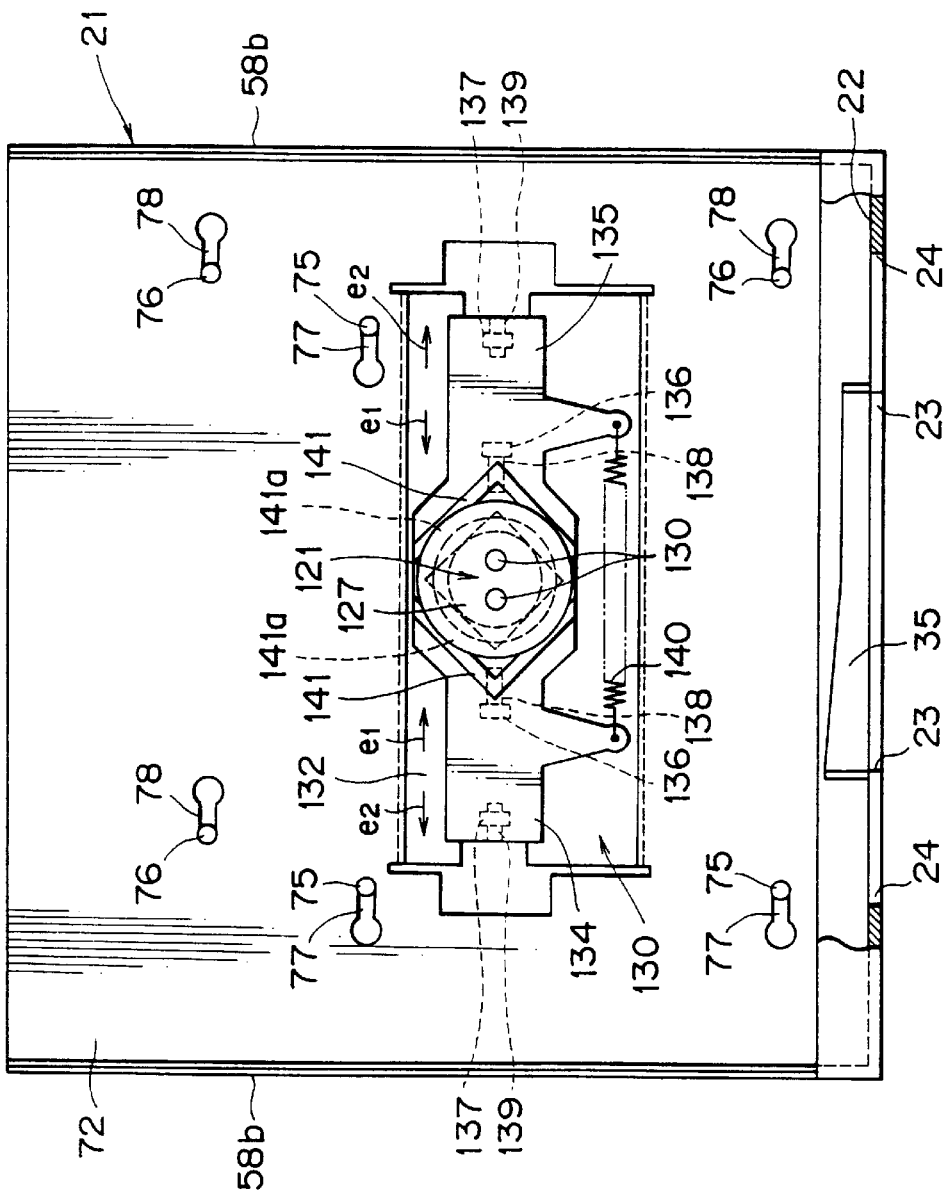
FIG. 21 is a partly cutout plan view of the entire part of an optical disc drive.

At the upper part in the recess 132 of the CD mechanical chassis 72, a couple of right and left cam sliders 134, 135 formed of synthetic resin are arranged horizontally, the couple of right and left cam sliders 134, 135 are engaged to freely slide with a couple of guide grooves 138, 139 formed on the CD mechanical chassis 72 by means of a couple of guide projections 136, 137 formed integrally with the lower surfaces of such cam sliders, and a couple of these cam sliders 134, 135 can be symmetrically slid freely in the directions of arrow marks e1, e2 orthogonal to the loading direction in the recess 132. The cam sliders 134, 135 are urged to slide in the direction of arrow mark e1 to relatively come close with each other by means of a cam slider spring 140 as the slide urging means consisting of a tensile coil spring extended between these right and left cam sliders 134, 135 as shown in FIG. 21. A couple of right and left cam projected portions 141 having almost the V-shape flat surface and cam surface 141a in which side surface shape at the cross-section is inclined almost to 45 degrees or so are integrally formed symmetrically for the right and left sides at the upper part of the internal side end of a couple of these cam sliders 134, 135, the cam surfaces 141a of a couple of cam projected portions 141 are pressed mutually in the direction of arrow mark e1 by means of a cam slider spring 140 in both right and left sides of the chucking pulley body 122 at the lower part of the upper flange 127 of the chucking pulley 121. Moreover, a couple of right and left pin inserting holes 144 are formed to a couple of projected pieces 142, 143 integrally projected to the internal side from a couple of right and left slider guides 73, 74 and a couple of guide pins 137 arranged at the lower part of the external side of a couple of cam sliders 134, 135 are inserted with play in the direction of arrow marks e1, e2 in a couple of these pin inserting holes 144.

Figure 22:
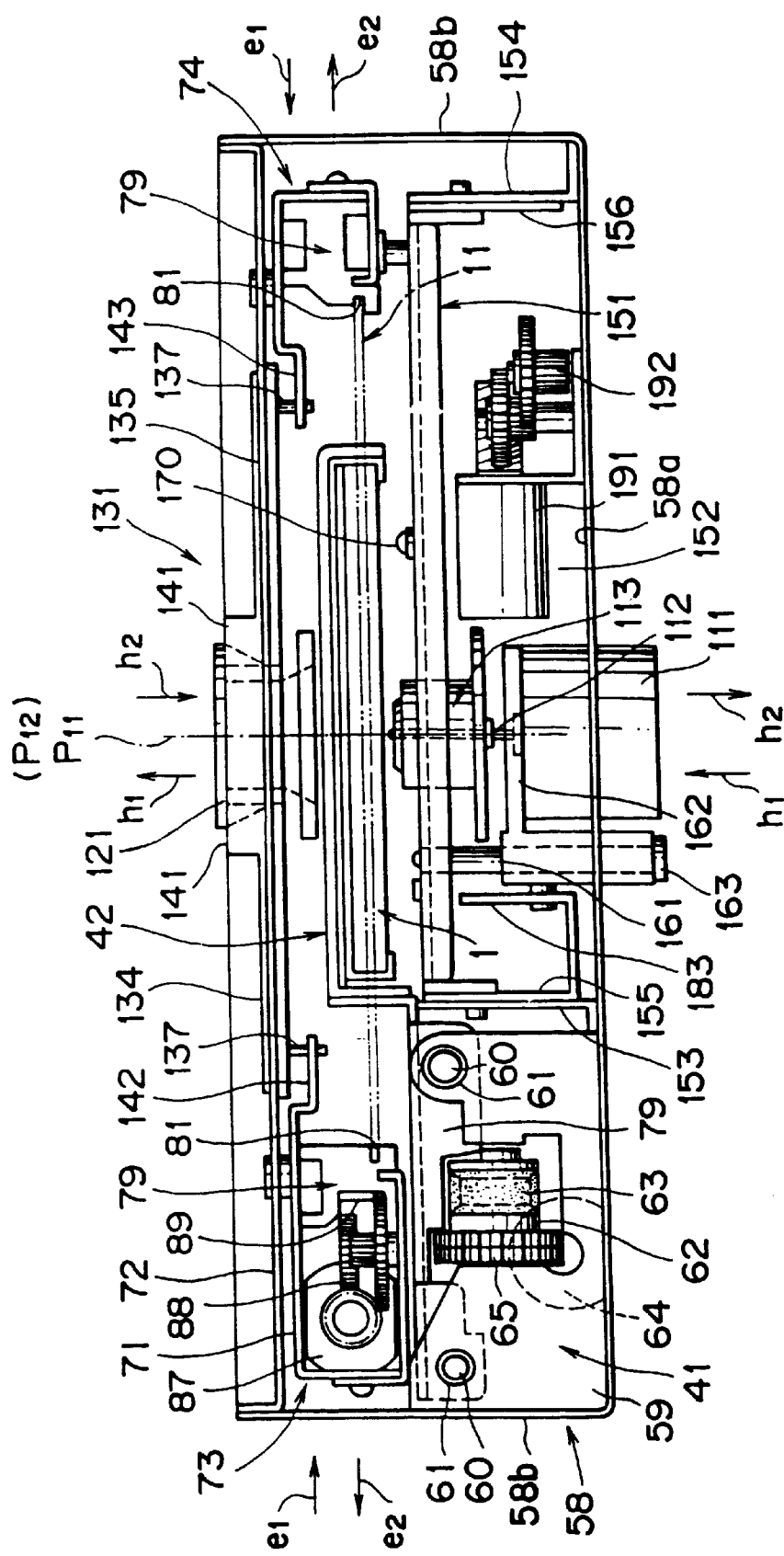
FIG. 22 is a front elevation of the condition where the front panel of FIG. 21 is removed.
Figure 24:
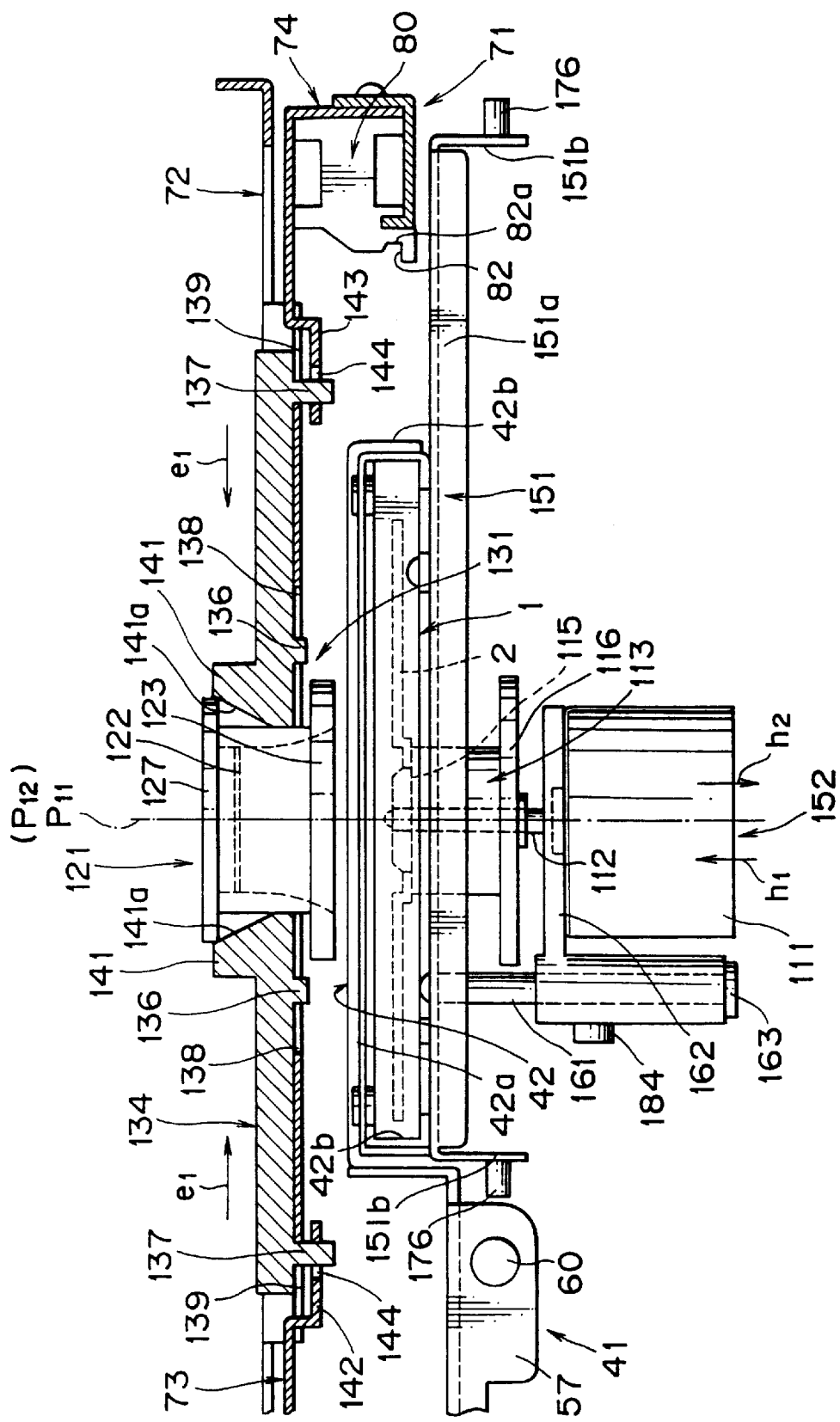
FIG. 24 is a partly cutout front elevation for explaining the MD chucking condition of FIG. 23.
Figure 25:
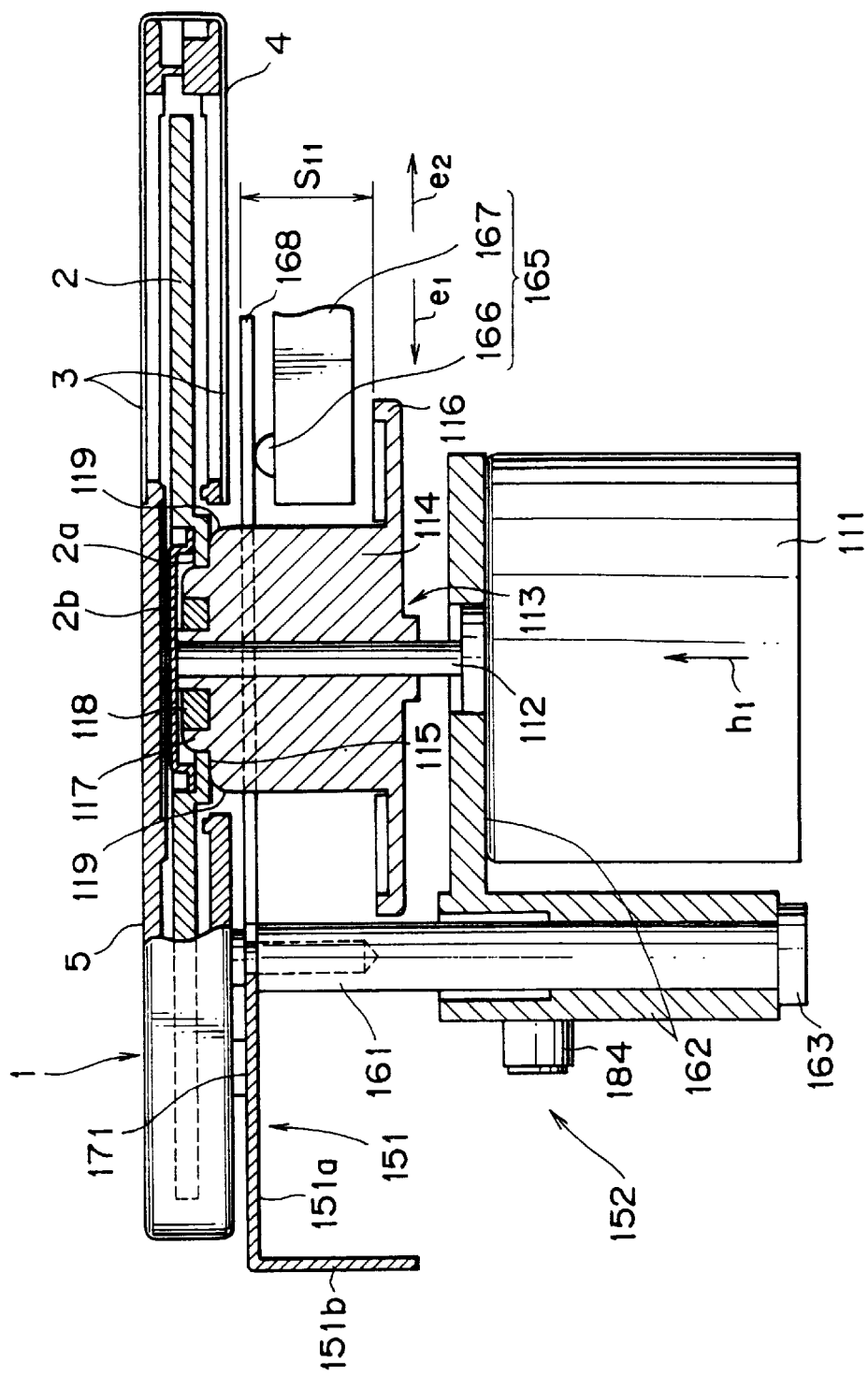
FIG. 25 is a partly cutout front elevation in which the essential portion of FIG. 24 is enlarged.
Figure 26:
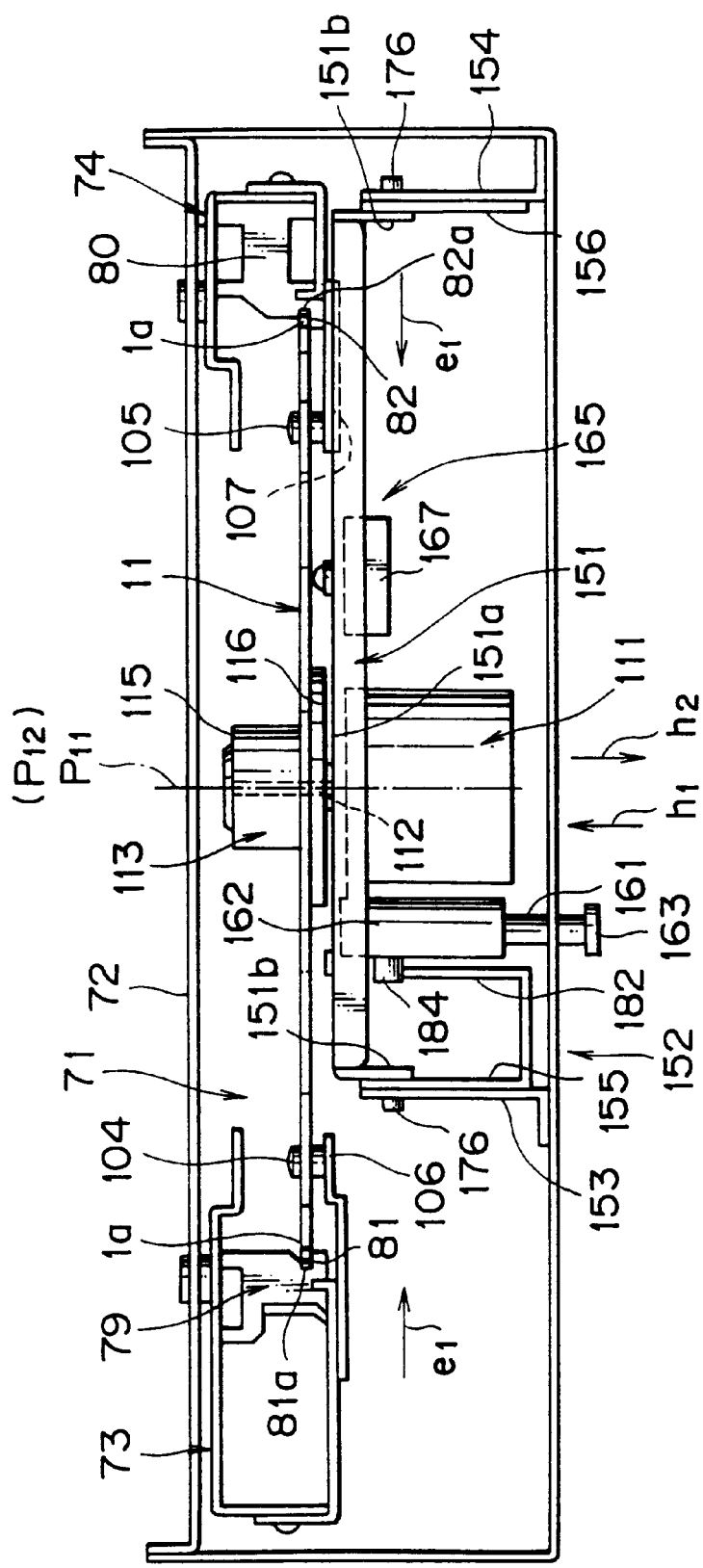
FIG. 26 is a front elevation of the CD loading end condition when the CD loading apparatus of FIG. 22 is taken out.

Therefore, according to this chucking pulley lifting apparatus 131, when a couple of slider guides 73, 74 are isolated with the minimum interval S1 or intermediate interval S2 shown in FIG. 30, as shown in FIG. 21, FIG. 22 and FIG. 24, a couple of cam sliders 134, 135 are symmetrically and closely arranged in the direction of arrow mark e1 by the cam slider spring 140 and the cam surfaces 141a of a couple of these cam projected portions 141 are pushed in the direction of arrow mark e1 toward both right and left sides of the chucking pulley body 122 of the chucking pulley 121. The upper flange 127 of the chucking pulley 121 is pushed in parallel in the direction of arrow mark h1, namely in the upper direction by these cam surfaces 141a and thereby the chucking pulley 121 is maintained in condition that it is lifted in the direction of arrow mark h1 up to the lifting position. When the chucking pulley 121 is lifted, the CD chucking flange 123 at the lower end of the chucking pulley 121 is lifted higher than the slide space in the directions of arrow marks a1, a2 of the cartridge holder 42.

Figure 28:
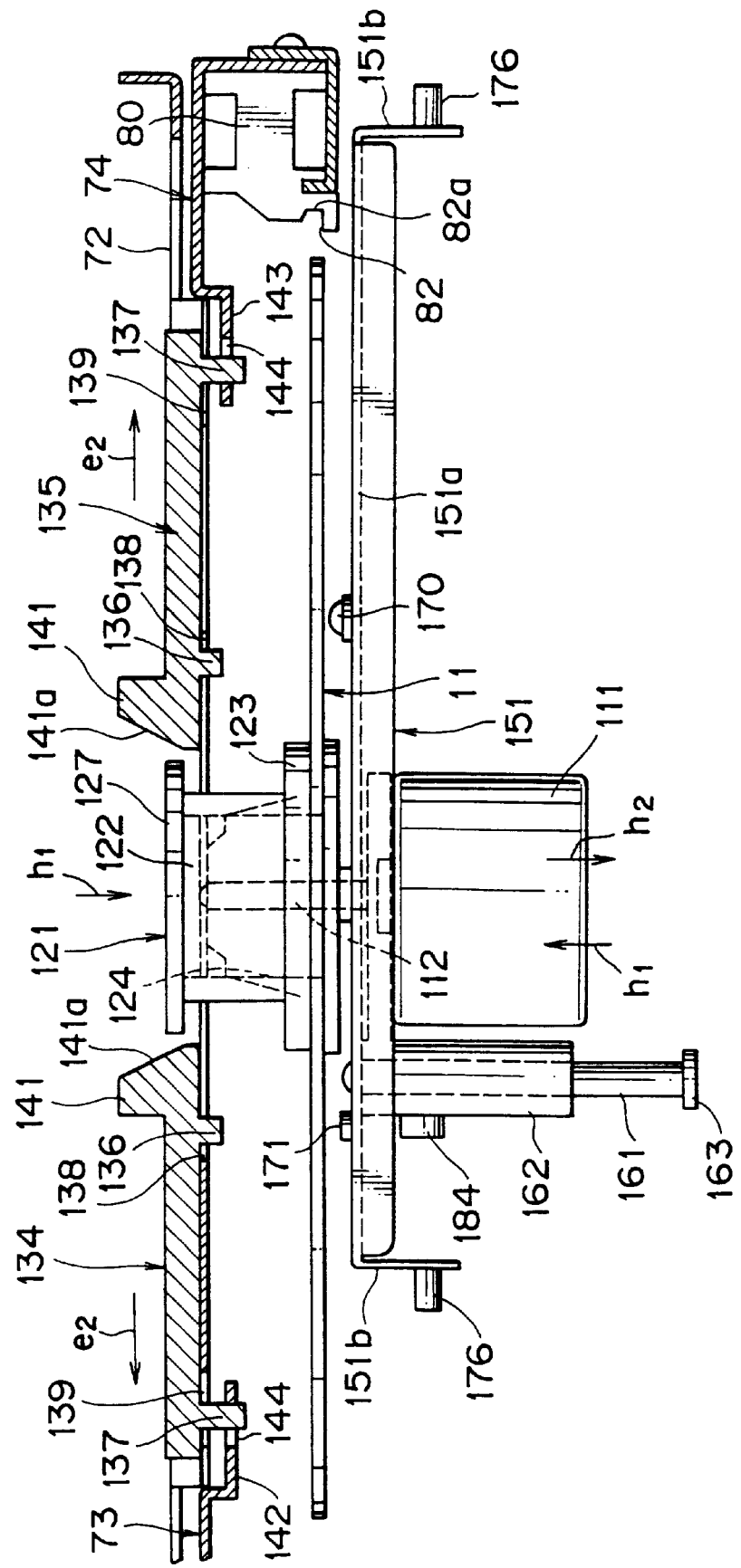
FIG. 28 is a partly cutout front elevation showing the CD chucking end condition of FIG. 7.
Figure 29:
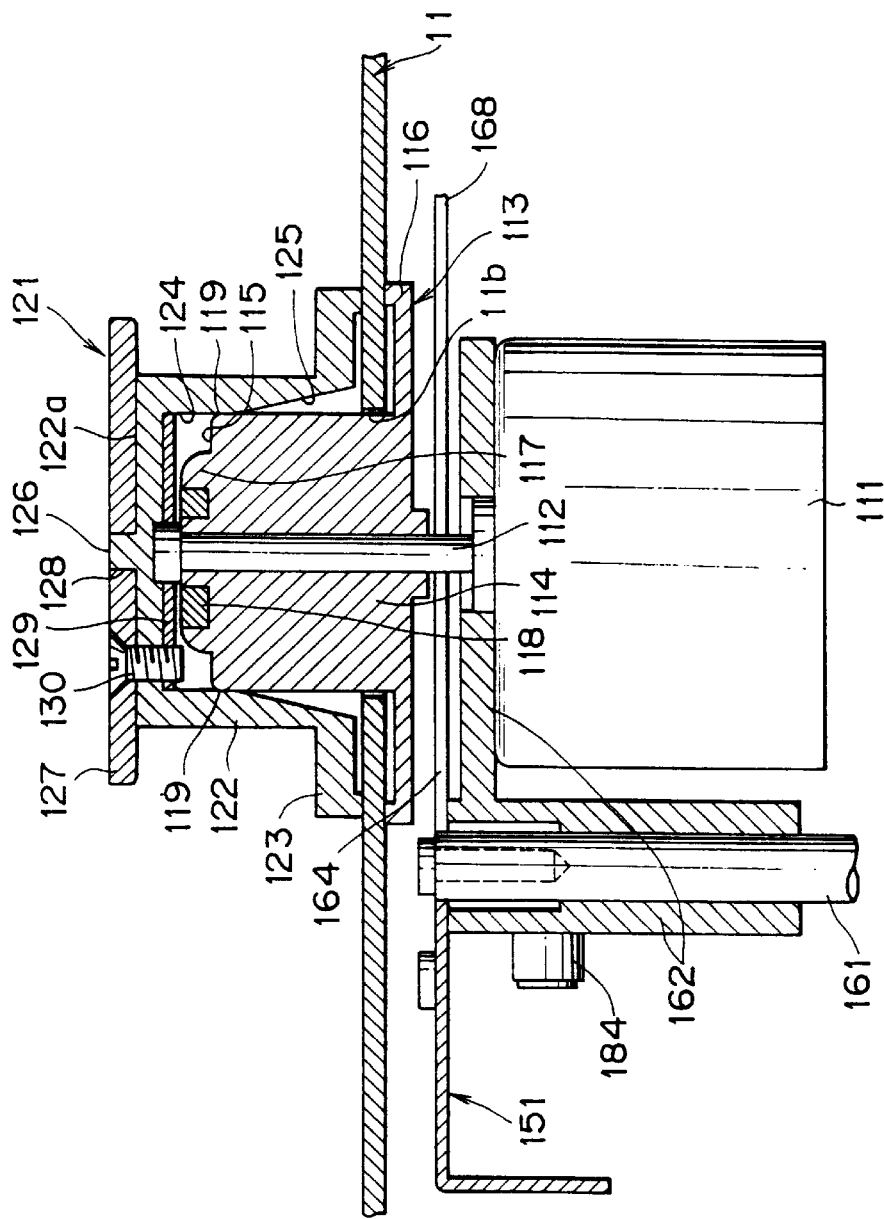
FIG. 29 is a partly cutout front elevation where the essential portion of FIG. 28 is enlarged.

When a couple of right and left slider guides 73, 74 are opened in the direction of arrow mark e2 up to the maximum interval S3 shown in FIG. 32, the guide pin 137 of a couple of right and left cam sliders 134, 135 is pulled in the direction of arrow mark e2 by a couple of projected pieces 142, 143 as shown in FIG. 28 and a couple of these right and left cam sliders 134, 135 are isolated in the direction of arrow mark e2 against the cam slider 140. Thereby, the interval between a couple of these right and left projected portions 141 is enlarged and the chucking pulley 121 is moved downward by the self-weight in the arrow mark h2 up to the lower moving position for chucking CD 11 on the CD table 116 of the disc table 113.

(5) Explanation About Mechanical Deck and Spindle Motor Lifting Apparatus

Next, as shown in FIG. 9 to FIG. 14, FIG. 22 to FIG. 29, the mechanical deck 151 formed by metal plate is arranged horizontally at the position lower than the MD loading apparatus 41 and CD loading apparatus 71 and the mechanical deck and spindle motor lifting apparatus 152 for driving the mechanical deck 151 and disc table 113 to lift in the vertical direction of arrow marks h1, h2 are mounted on the bottom surface 58a of the main chassis 58.

First, the mechanical deck 151 is formed in almost U-shape of a horizontal ceiling plate 151a, and right and left side plates 151b bent in vertical to the lower side from the right and left edge portions of the ceiling plate 151a. The mechanical deck and spindle motor lifting apparatus 152 is structured by a couple of right and left guide plates 153, 154 mounted vertically on the bottom plate 58a, a couple of right and left slide plates 155, 156 which are arranged vertically between a couple of right and left guide plates 153, 154 and are simultaneously slid symmetrically in the direction of arrow marks a1, a2 and a drive mechanism 157 for simultaneously driving to slide a couple of right and left slide plates 155, 156.

First, two lifting guide shafts 161 are provided vertically for keeping an interval in the loading direction (direction of arrow marks a1, a2) at the lower part in one side of the ceiling plate 151a of the mechanical deck 151 and a spindle motor holder 162 formed of synthetic resin is also provided to freely lift in the direction of arrow marks h1, h2 as the vertical direction along these two lifting guide shafts 161. The spindle motor 111 is vertically fixed toward upper side with a small screw, etc. at the lower part of the spindle motor holder 162 and this spindle motor 111 and the disc table 113 fixed to the spindle motor 112 are provided to freely lift in the direction of arrow marks h1, h2 for the mechanical deck 151 along the two vertical lifting guides shafts 161. At the lower end of one vertical lifting guide shaft 161, a stopper 163 is provided to restrict the lower limit position of the spindle motor 111.

The ceiling plate 151a of the mechanical deck 151 is provided with a disc table inserting hole 164 through which the disc table body 114 of the disc table 113 is vertically inserted and an aperture 168 for optical pickup for sliding a carriage 157 on which an objective lens 166 of an optical pickup 165 as a means to record and/or reproduce the MD 2 and CD 11. This aperture 168 for optical pickup is formed in longer length along the direction of arrow marks e1, e2 orthogonal to the loading center P11 in the opposite side to the vertical lifting guide shaft 161 of the disc table inserting hole 164. The carriage 167 of the optical pickup 165 is structured to move horizontally in the direction of arrow marks e1, e2 along the aperture 168 for optical pickup by a carriage moving mechanism (not illustrated) mounted at the lower part of the ceiling plate 151a. Moreover, a couple of positioning references pins 170 which are also used as the height reference pins and a height reference pin 171 are provided vertically for positioning of the MD cartridge 1 in the periphery of the spindle motor 111.

In addition, three guide pins 176 in total mounted at both sides of the right and left side plates 151b of the mechanical deck 151 are inserted to freely slide within three vertical guide grooves 177 in total formed to a couple of right and left guide plates 153, 154 as shown in FIG. 33 to FIG. 35, FIG. 37 and the mechanical deck 151 is mounted to slide in the direction of arrow marks h1, h2 as the vertical direction for a couple of right and left guide plates 153, 154. A couple of right and left slide plates 155, 156 are inserted to freely slide to four guide pins 178 in total provided at the internal side of a couple of right and left guide plates 153, 154 by means of four horizontal guide grooves 179 in total and a couple of these right and left slide plates 155, 156 are provided to freely slide in the direction of arrow marks a1, a2 as the forward and backward direction for a couple of right and left guide plates 153, 154.

Three guide pins 176 in total provided to the right and left side plates 151b of the mechanical deck 151 are inserted to freely slide to three cam grooves 180 in total formed to a couple of right and left slide plates 155, 156 and the mechanical deck 151 can be driven to lift horizontally through the parallel movement in the direction of arrow marks h1, h2 by means of these cam grooves 180. At one end portions of these three cam grooves 180, a horizontal groove 181 for over-stroke is connected. Since a couple of right and left slide plates 155, 156 are driven to slide symmetrically, as will be explained later, in the direction of arrow marks a1, a2, these cam grooves 180 and horizontal groove 181 for over-stroke are formed symmetrically in the forward and backward direction. Moreover, a vertical cam plate 182 which is horizontal and bent almost in a U-shape toward the upper side is provided at the internal side of the slide plate 155 which is provided near the spindle motor 111 at the internal side of the lifting guide shaft 60 of the loading apparatus explained previously and the cam surface 183 formed at the end surface of this cam plate 182 drives a roller mounted on the side surface of the spindle motor holder 162 to lift in the direction of arrow marks h1, h2.

A drive mechanism 157 as shown in FIG. 36 is provided with a lifting drive motor 191 mounted on the bottom plate 58a of the main chassis 58, a gear train 192 and a lifting drive lever 194 formed to freely rotate in the direction of arrow marks j1, j2 around the fulcrum pin 193 and the lifting drive motor 191 drives the rack 195 formed in the arc-shape at one end side of the lifting drive lever 194 to freely rotate via the gear train 192. A couple of right and left drive pins 196, 197 provided vertically at the upper part of both ends of the lifting drive lever 194 are engaged with the internal side of lower ends of a couple of right and left slide plates 155, 156 to freely slide in the engaging grooves 200, 201 of a couple of right and left engaging pieces 198, 199 formed horizontally at the right angle.

As shown in FIG. 36 and FIG. 37, a drive lever 99 forming an open/close drive mechanism 102 in the CD opening mechanism 91 is provided to freely rotate horizontally in the direction of arrow marks i1, i2 via the fulcrum pin 100 at the upper part of the rear end side (in the side of the direction of arrow mark a1) of the guide plate 15 provided at the external side thereof, a drive projection 156a integrally bent at the upper part of the rear end side of the external slide plate 156 is placed in contact, from the direction of arrow mark a2, with the pin 99a to be driven provided vertically at the lower side of the bell-crank shape drive lever 99 and the other end 99b of the drive lever 99 is placed in contact, from the direction of arrow mark e2, with the internal side of the pin 101 to be driven provided vertically at the lower part of the rear end side of the slider guide 74 of the CD loading apparatus 71 explained previously.

The disc table 113, chucking pulley 121, chucking pulley lifting apparatus 131, mechanical deck 151, mechanical deck and spindle motor lifting apparatus 152 are structured as explained above. As explained previously, MD 2 and CD 11 which are selectively loaded by the MD loading apparatus 41 and CD loading apparatus 71 are selectively chucked on the MD table 115 and CD table 116 of the disc table 113 by the following procedures.

Figure 33:
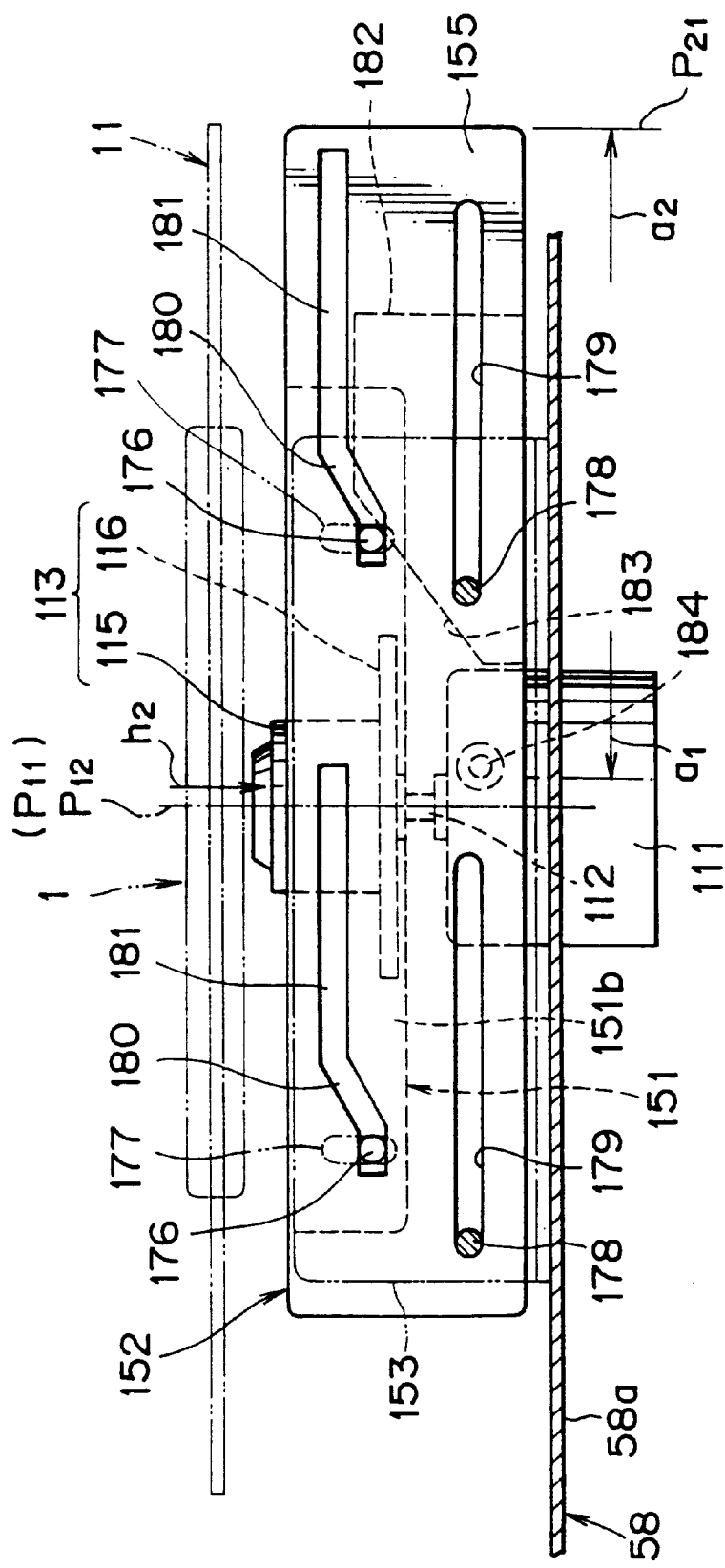
FIG. 33 is a partly cutout side elevation at the plane C—C in FIG. 36 for explaining the mechanical deck and disc table lifting apparatus.

That is, under the condition before starting the loading, the lifting drive lever 194 is reset, by the mechanical deck and drive mechanism 157 of the spindle motor lifting apparatus 152, in the direction of arrow mark j2 up to the position indicated by the chain line in FIG. 36 and a couple of right and left slide plates 155, 156 are reset to slide in the direction of arrow marks a1, a2 as the opposite direction up to the position P21 indicated by the chain line in FIG. 36. In this timing, as shown in FIG. 33 and FIG. 37, three guide pins 176 in total slide and drop to the lower end of three cam grooves 180 in total and the mechanical deck 152 horizontally drops in the direction of arrow mark h2 to the drop position. Moreover, in this timing, as shown in FIG. 33, a roller 184 is isolated in the direction of arrow mark a1 from the cam surface 183 of the cam plate 182 and as shown in FIG. 22, the spindle motor 111 and disc table 113 move downward in the direction of arrow mark h2 to the drop position by the self weight thereof and the spindle motor holder 162 stops in contact with the stopper 163 at the lower end of two vertical lifting guide shafts 161.

Therefore, in this case, as shown in FIG. 22, both mechanical deck 151 and spindle motor 111 have moved downward to the drop position and the disc table 113 has also moved downward in the direction of arrow mark h2 to the position lower than the loading path of the MD cartridge 1 and CD 11. Moreover, in this case, a couple of cam sliders 134, 135 of the chucking pulley lifting apparatus 131 are relatively set in the close position with each other from the direction of arrow mark e1 by means of the cam slider spring 140. With a couple of right and left cam projected portions 141, the chucking pulley 121 is moved upward in the direction of arrow mark h1 up to the position higher than the loading path of the MD cartridge 1 and CD 11.

As explained previously, when the MD cartridge 1 is loaded, as shown in FIG. 11, FIG. 23 to FIG. 25, up to the chucking center P12 on the loading center P11 by the cartridge holder 42 of the MD loading apparatus 41 and completion of loading of the MD cartridge 1 is detected by the loading sensor, the arc-shape rack 195 is driven, as shown in FIG. 36, via the gear train 192 by the mechanical deck and the lifting drive motor 192 of the drive mechanism 157 in the spindle motor lifting apparatus 152 and thereby the lifting drive lever 194 is driven to rotate in the direction of arrow mark j1 from the position indicated by the chain line. A couple of right and left slide plates 155, 156 are symmetrically driven to freely slide in the direction of arrow marks a1, a2 from the position P12 indicated by the chain line in FIG. 36 via a couple of right and left drive pins 196, 197 and the mechanical deck 151 is raised vertically through the parallel movement in the direction of arrow mark h1 up to the rising position indicated in FIG. 23 to FIG. 25 by means of three cam grooves 180 in total of a couple of these slide plates 155, 156.

Namely, the lifting drive operation of the mechanical deck in this timing will be explained in regard to one slide plate 155 with reference to FIG. 33 and FIG. 34. The sliding direction of the other slide plate 156 is opposed to that of one slide plate 155, but since the lifting drive operation of the mechanical deck 151 by the cam groove 180 is the same, it is explained only for one slide plate 155 and that of the other slide plate 156 will be omitted here.

Figure 34:
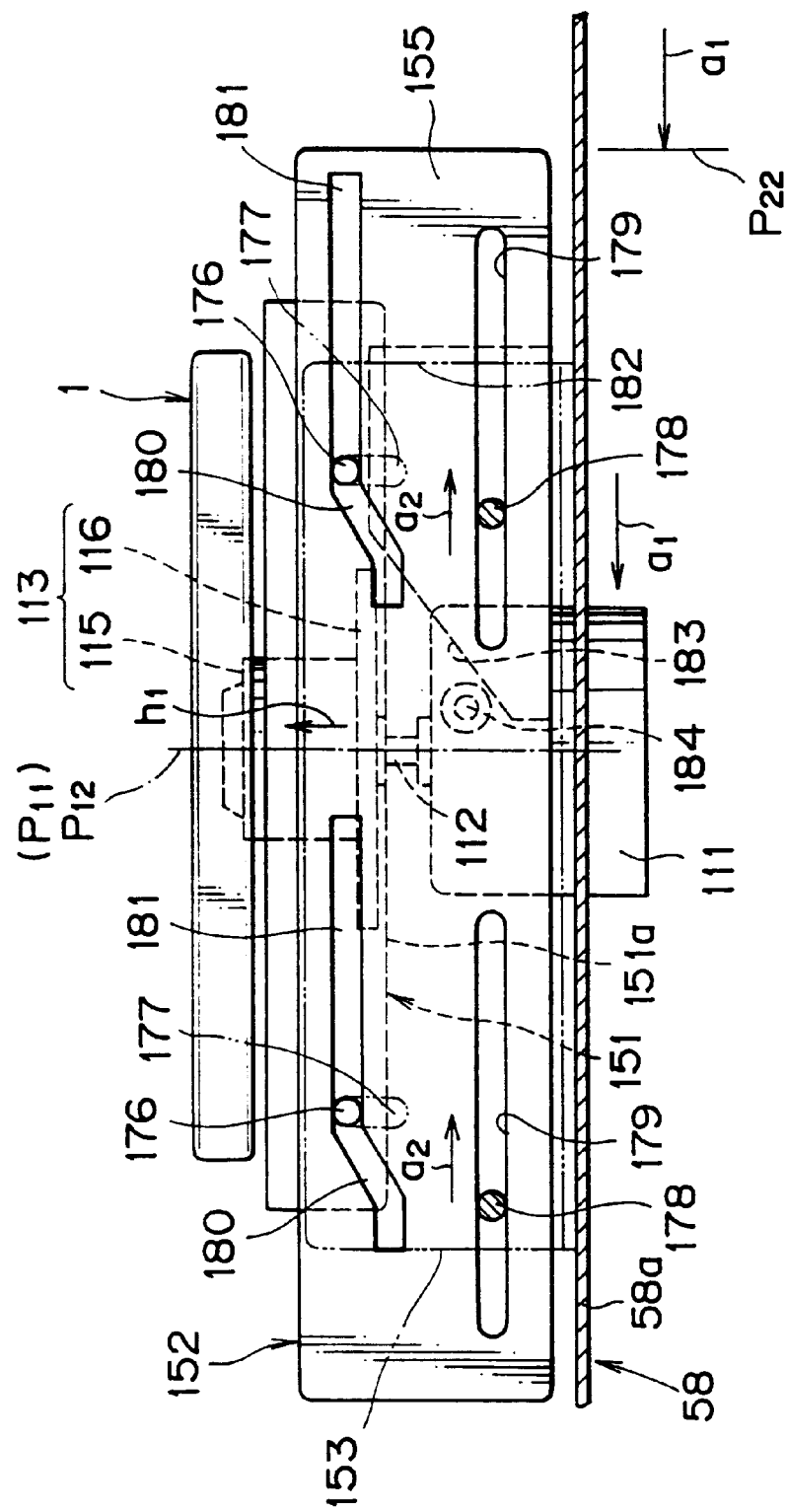
FIG. 34 is a partly cutout side elevation similar to FIG. 33 for explaining the mechanical deck and the driving condition of the disc table lifting apparatus during the MD loading.

That is, after completion of this MD loading, the slide plate 155 is driven to slide for the smaller stroke in the direction of arrow mark a1 up to the position P22 shown in FIG. 34 from the position P21 shown in FIG. 33. Thereby, three guide pins 176 in total of which movement in the direction of the arrow marks a1, a2 is restricted by the three vertical guide pins 177 in total are relatively caused to slide over in the direction of arrow mark a2 up to the upper end from the lower end of the three cam grooves 180 in total. Accordingly, the mechanical deck 151 is raised vertically in the direction of arrow mark h1 through the parallel movement up to the rising position shown in FIG. 34 from the drop position shown in FIG. 33. Thereby, the MD cartridge 1 is relatively engaged from the direction of arrow mark h2 with a couple of positioning pins 170 and height reference pins 171 on the mechanical deck 151 and the MD cartridge 1 is horizontally positioned on the mechanical deck 151.

Figure 23:
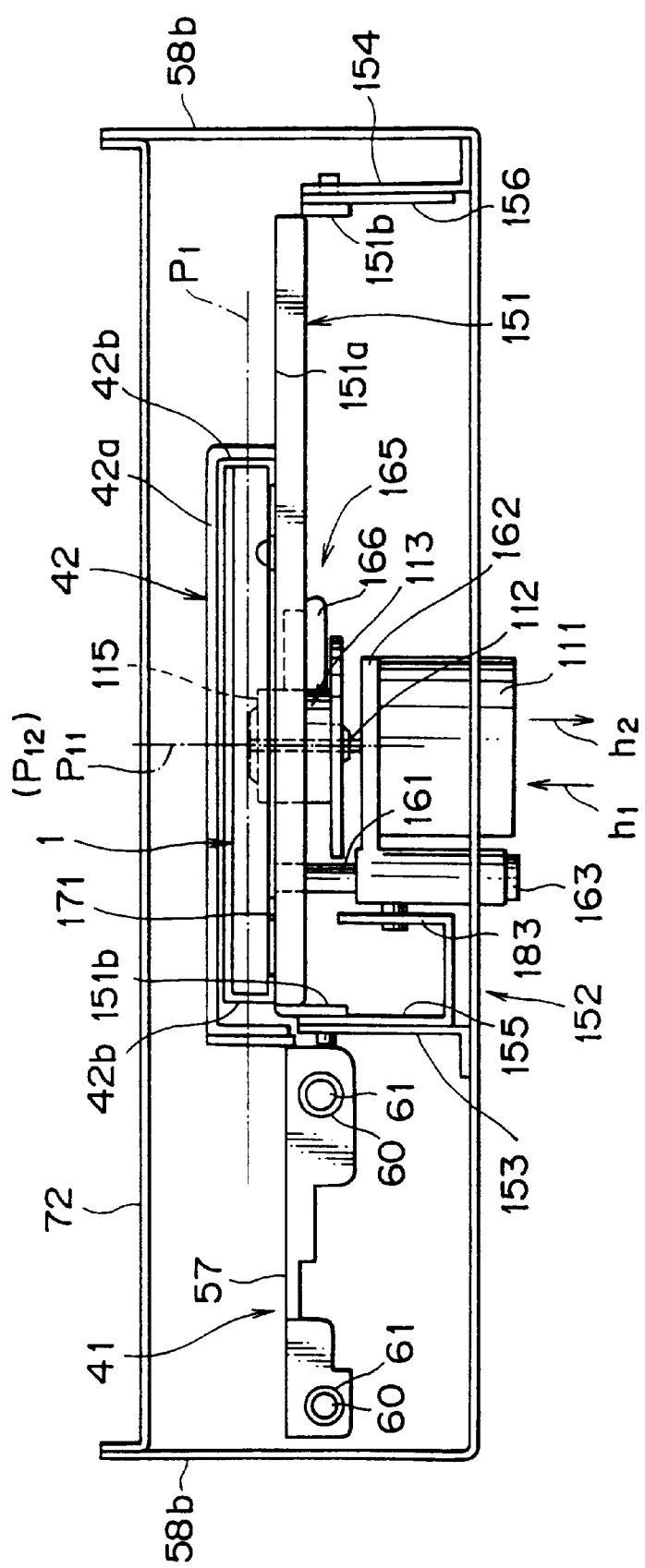
FIG. 23 is a front elevation of the MD loading end condition when the MD loading apparatus of FIG. 22 is taken out.

Thereby, two vertical lifting guide shafts 161 are also raised in the direction of arrow mark h1 together with the mechanical deck 151, the spindle motor holder 162 is pushed upward by the stopper 163 and thereby the spindle motor 111 is also raised vertically in the direction of arrow mark h1 only for the small rising stroke up to the rising position of the first stage shown in FIG. 23 to FIG. 25 from the drop position shown in FIG. 22 together with the mechanical deck 151. The MD table 115 formed at the upper end of the disc table 113 is inserted in the direction of arrow mark h1 within the MD cartridge 1 from the disc table insertion slot 5 formed at the lower surface of the MD cartridge 1 held horizontally in the cartridge holder 42.

As shown in FIG. 25, the centering guide 117 of the MD table 115 is engaged with the center hole 2a of MD 2 from the direction of arrow mark h1 and a magnet 118 of the MD table 115 is provided closely to a yoke 2b fixed at the upper part of the center hole 2a of MD2. Thereby, the MD2 is horizontally chucked on the MD table 115 with magnetic attracting force of the yoke 2b caused by the magnet 118. In this case, the MD2 is pushed to almost the intermediate position in the MD cartridge 1 in the direction of arrow mark h1 by means of the MD table 115.

Explained above, in short, is the chucking operation to the MD table 115 of the MD2 which is realized by selectively inserting the MD table 115 at the upper end of the disc table 113 into the MD cartridge 1 in the direction of arrow mark h1 orthogonal to the loading direction (direction of arrow mark a1) of the MD cartridge 1. When the mechanical deck 151 is raised up to the rise position, as shown in FIG. 25, the objective lens 166 mounted to the carriage 167 of the optical pickup 165 is provided closely to the lower surface of the MD2 from the head inserting slot 3 of the MD cartridge 1.

Therefore, while the MD 2 is driven to rotate at a higher speed together with the disc table 113 by the spindle motor 111 after the chucking of MD 2 and the objective lens 166 is sought in the direction of arrow marks e1, e2 by the carriage 167 of the optical pickup 165, data is recorded and/or reproduced to/from the MD2 with the laser beam radiated to the lower surface of MD2 from the objective lens 166.

In this case, as shown in FIG. 25, since the space S11 between the ceiling plate 151a of the mechanical deck 151 and the CD table 116 at the lower end of the disc table 113 is set to the size through which the carriage 167 can enter with sufficient allowance, the carriage 167 can be moved freely in the direction of arrow mark e1 up to the upper position of the CD table 116 and data recording and/or reproducing can be realized by the objective lens 166 up to the inner most circumference position of MD2.

After the recording and/or reproducing of MD 2, as shown in FIG. 36, the lifting drive lever 194 is reset to rotate in the direction of arrow mark j2 up to the position indicated by the chain line with the mechanical deck 151 and the lifting drive motor 191 of spindle motor lifting apparatus 152 and a couple of right and left slide plates 155, 156 are reset to slide in the direction of arrow marks a1, a2 up to the position indicated by the chain line. With the inverse operation of that explained above, the mechanical deck 151 and spindle motor 111 are dropped in the direction of arrow mark h2 to the drop position shown in FIG. 22, the MD table 115 of the disc table 113 is isolated downward from the MD 2 and it is moved downward in the direction of arrow mark h2 to the position lower than the MD cartridge 1.

Figure 35:
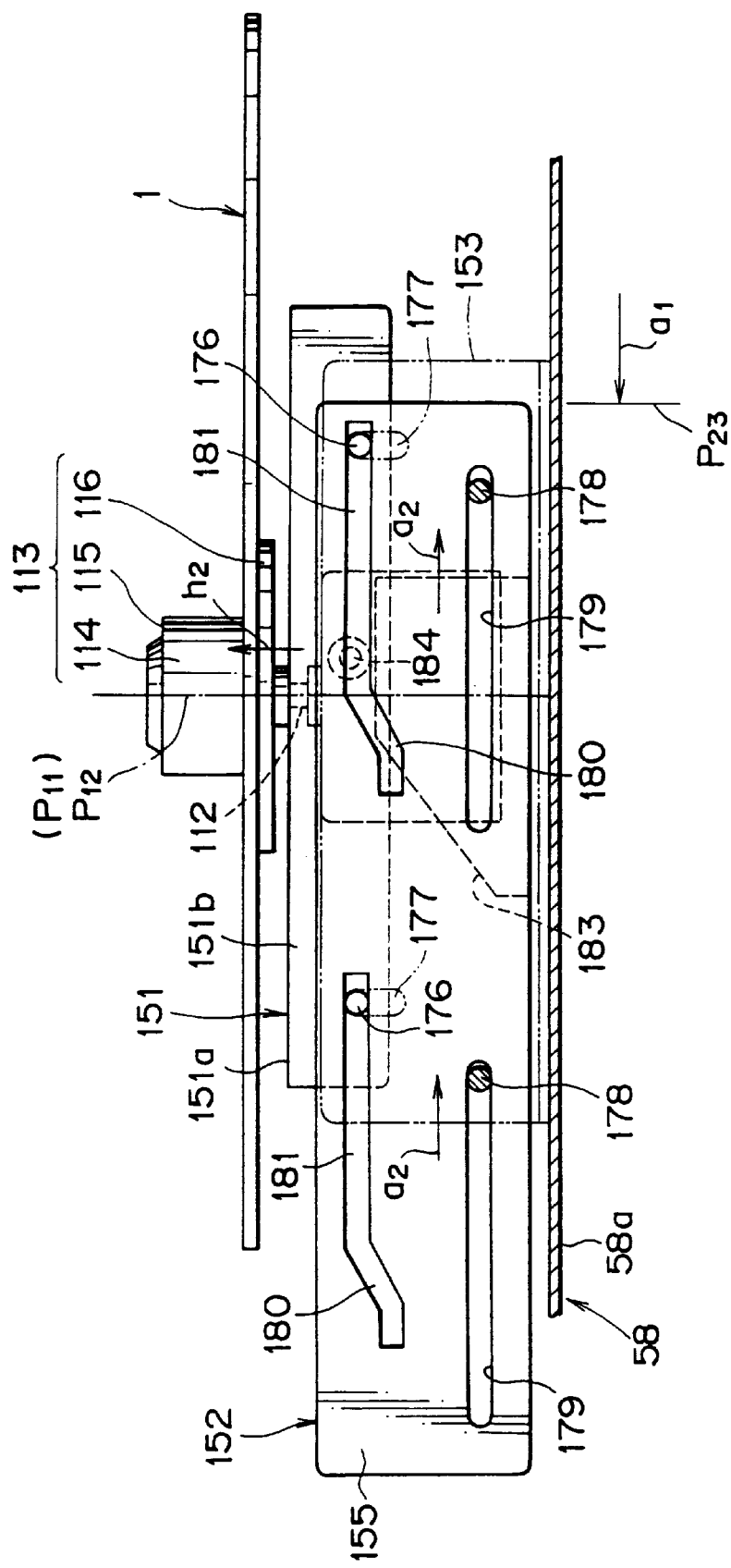
FIG. 35 is a partly cutout side elevation similar to FIG. 33 for explaining the mechanical deck and the driving condition of the disc table lifting apparatus during the CD loading.

Next, as explained above, CD 11 is loaded up to the chucking center P12 on the loading center P11 by the CD loading apparatus 71 as shown in FIG. 10, FIG. 16, FIG. 19, FIG. 20 and FIG. 26 to FIG. 29, when completion of loading of CD 11 is detected by the loading sensor, the lifting drive lever 194 is driven to rotate in the direction of arrow mark j1 indicated by the chain line by the mechanical deck 151 and the lifting drive motor 191 of the drive mechanism 157 in the spindle motor lifting apparatus 152 as shown in FIG. 36 like that after the completion of MD loading and a couple of right and left slide plates 155, 156 are driven to slide in the direction of arrow marks a1, a2 as the opposite direction from the position P12 indicated by the chain line shown in FIG. 35.

In regard to one slide plate 155 shown in FIG. 33 to FIG. 35, after completion of the CD loading, the slide plate 155 passes the position P22 shown in FIG. 34 from the position P21 shown in FIG. 33 and is then driven to slide only for the large stroke in the direction of arrow mark a1 up to the position P23 shown in FIG. 35. Thereby, while the slide plate 155 is slid up to the position P22 from the position P21, three guide pins 176 in total slide up to the upper end from the lower end of the three cam grooves 180 in total as explained above and thereby the mechanical deck 151 is raised vertically in the direction of arrow mark h1 through the parallel movement up to the rise position shown in FIG. 34 from the drop position shown in FIG. 33. In this case, three guide pins 176 in total slide up to the upper end of the three cam grooves 180 in total and then horizontally slide in the direction of arrow marks a1, a2 within the three horizontal grooves 181 in total for over-stroke. When the sliding of the slide plate 155 up to the position P23 is detected by the sensor (not illustrated), the lifting drive motor 191 is stopped.

Figure 27:
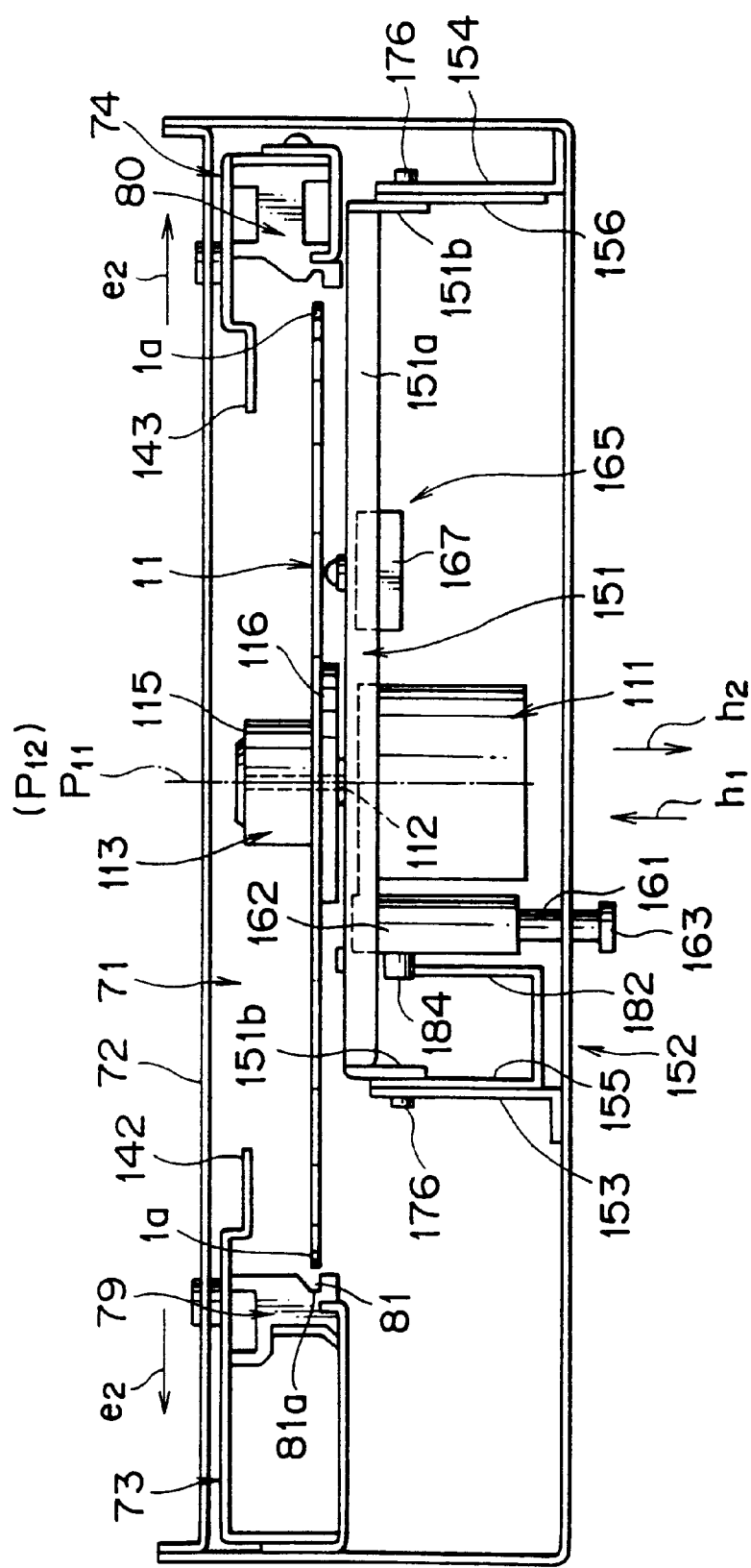
FIG. 27 is a front elevation where holding of CD is canceled in the CD loading apparatus of FIG. 26.

However, in this case, since the slide stroke of the slide plate 155 is large, a roller 184 of the spindle motor holder 162 slides up relatively in the direction of arrow mark a2 on the cam surface 183 of the cam plate 182 until it is raised up to the upper part of the cam plate 183 as shown in FIG. 25 and FIG. 27. Thereby, as shown in FIG. 27 to FIG. 29, the spindle motor holder 162 is driven to rise in the direction of arrow mark h1 up to the upper end along the two vertical lifting guide shafts 161, the spindle motor 111 is further raised in the direction of arrow mark h1 for the mechanical deck 151 by the spindle motor holder 162 and this spindle motor 111 is further vertically raised in the direction of arrow mark h1 for the large rising stroke up to the rise position of the second stage shown in FIG. 26, FIG. 27 and FIG. 35. Here, the disc table body 114 of the disc table 113 is inserted from the direction of arrow mark h1 into the center hole 11b of CD 11 by means of the chamfering part 119 and thereby CD 11 is horizontally placed on the CD table 116 formed at the lower end.

Immediately after the slide plate 155 reaches the position P23, a drive projection 156a of the other slide plate 156 is placed in contact, as shown in FIG. 36, with a pin 99a at one end of the drive lever 99 from the direction of arrow mark a2 at the open drive mechanism 102 in the CD opening mechanism 91 in order to drive the drive lever 99 to rotate in the direction of arrow mark i1. The other end 99b of the drive lever 99 pushes the pin 101 to be driven of the other slider guide 74 in the direction of arrow mark e2.

Thereby, as shown in FIG. 32, the other slider guide 74 and CD slider 80 are driven to slide in the direction of arrow mark e2 against the CD hold spring 90, the rack 95 of the pinion mechanism 98 drives the pinion 97 to rotate in the direction of arrow mark g2 and the rack 94 is driven by the pinion 97 in the direction of arrow mark e2 to drive one slider guide 73 and CD slider 79 to slide symmetrically in the direction of arrow mark e2. Accordingly, an interval between a couple of right and left CD sliders 79, 80 is automatically enlarged to the maximum interval S3 which is larger than the diameter of CD 11, holding of CD 11 by a couple of these right and left CD sliders 79, 80 is reset and the CD 11 is placed horizontally on the CD table 116 of the disc table 113.

Moreover, in this case, the guide pins 137 of a couple of right and left cam sliders 134, 135 of the chucking pulley lifting apparatus 131 are pulled in the direction of arrow mark e2 as shown in FIG. 28 by means of a couple of right and left projected pieces 142, 143 of a couple of right and left slider guides 73, 74 driven to slide in the direction of arrow mark e2 as shown in FIG. 27 and thereby a couple of these right and left cam sliders 134, 135 are isolated relatively with each other in the direction of arrow mark e2.

Thereby, the chucking pulley 121 is moved downward by its self-weight in the direction of arrow mark h2, allowing its insertion hole 124 to be entered by the external circumference of the disc table body 114 of the disc table 113 in the direction of arrow mark h2 by means of the tapered surface 125. The magnet 118 of the disc table 113 is provided closely to the yoke 129 of the chucking pulley 121 and thereby the CD chucking flange 123 of the chucking pulley 121 chucks horizontally the CD 11 on the CD table 116 with a magnetic attracting force of the yoke 129 generated by the magnet 118.

In short, as explained above, the CD 11 is chucked on the CD table 116 by selectively inserting the disc table 113 into the center hole 11b of the CD 11 from the direction of arrow mark h1 orthogonal to the loading direction (direction of arrow marks a1, a2). When the mechanical deck 151 is raised up to the rise position, the optical pickup 165 is placed near the lower surface of CD 11 as shown in FIG. 27. Thereby, while the CD 11 is driven, after the chucking thereof, to rotate at a high speed together with the disc table 113 by the spindle motor 111, data recording and/or duplicating operation is performed to CD 11 by means of the optical pickup 165 as in the case of the MD 2. In this case, the carriage 151 of the optical pickup 165 is sought in the direction of arrow marks e1, e2 along the CD 11 at the external circumference position of the CD table 116.

After recording and/or reproducing of MD 2, as shown in FIG. 36, the lifting drive lever 194 is reset to rotate in the direction of arrow mark j2 up to the position indicated by a chain line by means of the mechanical deck 151 and the lifting drive motor 191 of the spindle motor lifting apparatus 152 and a couple of right and left slide plates 155, 156 are also reset to slide in the direction of arrow marks a1, a2 up to the position indicated by a chain line. With the inverse operation of that explained above, a couple of right and left slider guides 73, 74 and CD sliders 79, 80 are first relatively attracted in the direction of arrow mark e1 with the CD hold spring 90 and thereby the CD 11 is held again within the recessed grooves 81, 82 of a couple of right and left CD sliders 79, 80. Thereafter, as shown in FIG. 24, a couple of right and left cam sliders 134, 135 are attracted relatively in the direction of arrow mark e1 by the cam slider spring 140 and the disc table 113 is pushed again to lift in the direction of arrow mark h1 up to the rise position by means of these cam projected portions 141. Accordingly, the mechanical deck 151 and spindle motor 111 are moved downward in the direction of arrow mark h2 to the original drop position shown in FIG. 22 and the disc table 113 is further moved downward in the direction of arrow mark h2 to the position lower than the CD 11 in such a manner that the disc table body 114 of disc table 113 is removed to the lower side from the CD 11.

A preferred embodiment of the present invention has been explained but the present invention is not restricted thereto and allows various changes and modifications only within the range of technical aspect of the present invention. For example, in the preferred embodiment explained above, a disc cartridge such as MD cartridge is used as a first disc type recording medium and a bare disc such as CD is used as a second disc type recording medium, but the present invention can also be applied for various kinds of disc cartridges or various kinds of bare discs and moreover to various kinds of disc apparatuses for selectively recording and/or reproducing various kinds of disc cartridges and bare discs.

The disc drive of the present invention structured as explained above assures the following effects.

Since the first and second disc type recording media can be selectively loaded on the same loading center for selective chucking to the first and second disc table, the recording and/or reproducing means such as spindle motor and optical pickup of the disc drive can be used in common to such two kinds of disc type recording media, remarkable cost-down by reduction in the number of parts and assembling processes can be realized and reduction in size and weight of the disc drive as a whole can also be attained, although the disc drive can selectively record and/or reproduce two kinds of disc type recording media. Moreover, it is now possible to slot in two kinds of disc type recording media on the same loading center and thereby such disadvantage that a tray is rushed out to a large extent to the outside of the front panel to result in a certain kind of trouble when the disc is exhausted as in the case of the tray system is never generated. In addition, since two kinds of disc type recording media can be recorded and/or reproduced on the same loading center, total thickness of the disc drive as a whole can be reduced.

Since a means for moving the mechanical deck having loaded the first and second disc tables in the direction almost orthogonal to the loading direction of two kinds of disc type recording media is provided and a means for selectively recording and/or reproducing these two kinds of disc type recording media is loaded on the mechanical deck, two kinds of disc type recording media can be selectively chucked on the two kinds of disc tables at the same chucking position and these two kinds of disc type recording media can be selectively recorded and/or reproduced through the same recording and/or reproducing operation.

Since the first disc type recording medium is structured by a disc cartridge and the second disc type recording medium is structured by a bare disc of the diameter larger than the disc cartridge, two kinds of disc type recording media in different structures can selectively be recorded and/or reproduced by the small size, light weight and thinner disc drive.

Since the first loading means is arranged at the internal side of the second loading means and the first loading means is evacuated, at the time of loading a bare disc by the second loading means, to the evacuation position located at the outside of the loading path of the bare disc of the second loading means, the first loading means is not required to be evacuated up to the upper part of the bare disc at the time of loading the bare disc and thereby thickness of the disc drive as a whole can further be reduced.

Since the disc cartridge is structured by an MD cartridge and a bare disc is structured by a CD, MD cartridge and bare CD can be selectively recorded and/or reproduced by the small size, light weight and thinner disc drive.

What is claimed is:

1. A disc drive apparatus comprising:
   first loading means for loading a first disc recording medium;
   second loading means for loading a second disc recording medium having a structure different from a structure of said first disc recording medium, wherein said first loading means is arranged inside and separate from said second loading means and said first loading means is moved independently of said second loading means to an evacuating position located behind a second loading path of said second disc recording medium at a time of loading said second disc recording medium by said second loading means;
   insertion error inhibit means for inhibiting insertion of one of said first disc recording medium and said second disc recording medium, wherein said first recording medium inhibits insertion of said second disc recording medium when said first disc recording medium is loaded and said second disc recording medium inhibits insertion of said first disc recording medium when said second disc recording medium is loaded;
   a disc table having on a single assembly first means for receiving a center of said first disc recording medium and second means for receiving a center of said second disc recording medium; and
   means for arranging a first loading path and said second loading path of said first loading means and said second loading means, respectively, on a same loading center and for selectively inputting and outputting said disc table to/from said first loading path and said second loading path of said first loading means and said second loading means, respectively, in a direction substantially orthogonal to a loading direction of said first disc recording medium and said second disc recording medium.

2. The disc drive apparatus as set forth in claim 1, further comprising:
   means for moving a mechanical deck for loading said disc table in said direction substantially orthogonal to said loading direction of said first disc recording medium and said loading direction of said first disc recording medium and said second disc recording medium; and
   means for selectively recording and/or reproducing said first disc recording medium and said second disc recording medium, wherein said means for selectively recording and/or reproducing is mounted to said mechanical deck.

3. The disc drive apparatus as set forth in claim 2, wherein said mechanical deck is structured by providing a motor for rotating said disc table having said first means for receiving said center of said first disc recording medium and said second means for receiving said center of said second disc recording medium and an optical head for reading and/or for writing a signal from/to said first disc recording medium and said second disc recording medium.

4. The disc drive apparatus as set forth in claim 1, wherein said first disc recording medium is contained in a disc cartridge and said second disc recording medium is a bare disc without a disc cartridge.

5. The disc drive apparatus as set forth in claim 4, wherein said disc cartridge is structured as a mini-disc cartridge and said bare disc is structured as a compact disc.

6. The disc drive apparatus as set forth in claim 1, wherein a diameter of a first center hole provided at said center of said first disc recording medium is different than a diameter of a second center hole provided at said center of said second disc recording medium, a size of said disc table having said first means for receiving said center of said first disc recording medium corresponds to a size of said first center hole of said first disc recording medium and a size of said disc table having said second means for receiving said center of said second disc recording medium corresponds to a size of said second center hole of said second disc recording medium.

7. The disc drive apparatus as set forth in claim 6, wherein said diameter of said first center hole of said first disc recording medium is smaller than said diameter of said second center hole of said second disc recording medium and said disc table having said first means is structured for passing through said second center hole of said second disc recording medium.

8. The disc drive apparatus as set forth in claim 1, further comprising:

an insertion slot for selectively receiving thereinto said first disc recording medium and said second disc recording medium; and insertion control means for preferentially allowing an insertion of one of said first disc type recording medium and said second disc type recording medium through said insertion slot.

9. The disc drive apparatus as set forth in claim 1, further comprising:

display means for indicating that one of said first disc recording medium and said second disc recording medium is inserted into said disc drive apparatus.

10. A disc drive apparatus, comprising:

first loading means for loading a cartridge including a first disc recording medium;

second loading means for loading a bare second disc recording medium, wherein said first loading means is arranged inside and separate from said second loading means and said first loading means is moved independently of said second loading means to an evacuating position located behind a second loading path of said second disc recording medium by said second loading means at a time of loading said second disc recording means with said second loading means;

insertion error inhibit means for inhibiting insertion of one of said first disc recording medium and said second disc recording medium, wherein said first disc recording medium inhibits insertion of said second disc recording medium when said first disc recording medium is loaded and said second disc recording medium inhibits insertion of said first disc recording medium when said second disc recording medium is loaded;

a disc table having on a single assembly first means for receiving a center of said first disc recording medium and second means for receiving a center of said second disc recording medium; and an insertion slot for having inserted thereinto said first disc recording medium and said second disc recording medium, wherein said first disc recording medium and said second disc recording medium are loaded by setting a loading direction of said first loading means and said second loading means to a same direction and by moving said disc table having said first means for receiving a center of said first disc recording medium and said second means for receiving a center of said second disc recording medium in a direction substantially orthogonal to said loading direction of said first loading means and said second loading means.

11. The disc drive apparatus as set forth in claim 10, further comprising:

means for moving a mechanical deck for loading said disc table having said first means for receiving a center of said first disc recording medium and said second means for receiving a center of said second disc recording medium in said direction substantially orthogonal to said loading direction of said first disc recording medium and said second disc recording medium; and means for selectively recording and/or reproducing said first disc recording medium and said second disc recording medium, wherein said means is mounted to said mechanical deck.

12. The disc drive apparatus as set forth in claim 11, wherein said mechanical deck is structured by providing a motor for rotating said disc table having said first means for receiving a center of said first disc recording medium and said second means for receiving a center of said second disc recording medium and an optical head for reading and/or for writing a signal from/to said first disc recording medium and said second disc recording medium.

13. The disc drive apparatus as set forth in claim 10, wherein a diameter of a first center hole provided at said center of said first disc recording medium is different than a diameter of a second center hole provided at said center of said second disc recording medium, a size of said disc table having said first means corresponds to a size of said first center hole of said first disc recording medium and a size of said disc table having said second means corresponds to a size of said second center hole of said second disc recording medium.

14. The disc drive apparatus as set forth in claim 13, wherein said diameter of said first center hole of said first disc recording medium is smaller than said diameter of said second center hole of said second disc recording medium and said disc table having said first means is structured for passing through said second center hole of said second disc recording medium.

15. The disc drive apparatus as set forth in claim 10, further comprising:

an insertion slot for selectively receiving thereinto said first disc recording medium and said second disc recording medium; and insertion control means for preferentially allowing an insertion of one of said first disc recording medium and said second disc recording medium through said insertion slot.

16. The disc drive apparatus as set forth in claim 10, further comprising:

display means for indicating that one of said first disc recording medium and said second disc recording medium is inserted into said disc drive apparatus.

* * * * *